(12) United States Patent
Iglesias

(10) Patent No.: US 10,983,663 B2
(45) Date of Patent: Apr. 20, 2021

(54) DISPLAYING APPLICATIONS

(71) Applicant: Apple Inc., Cupertino, CA (US)

(72) Inventor: Samuel Lee Iglesias, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/651,249

(22) PCT Filed: Sep. 25, 2018

(86) PCT No.: PCT/US2018/052748
§ 371 (c)(1),
(2) Date: Mar. 26, 2020

(87) PCT Pub. No.: WO2019/067482
PCT Pub. Date: Apr. 4, 2019

(65) Prior Publication Data
US 2020/0293177 A1  Sep. 17, 2020

Related U.S. Application Data

(60) Provisional application No. 62/565,741, filed on Sep. 29, 2017.

(51) Int. Cl.
*G06F 3/048* (2013.01)
*G06F 3/0481* (2013.01)
(Continued)

(52) U.S. Cl.
CPC .......... *G06F 3/04815* (2013.01); *G06F 3/011* (2013.01); *G06F 3/04845* (2013.01); *G06K 9/00671* (2013.01); *G06T 7/73* (2017.01)

(58) Field of Classification Search
CPC .... G06F 3/011; G06F 3/04815; G06F 3/0425; G06F 3/0482; G06F 3/0488;
(Continued)

(56) References Cited

U.S. PATENT DOCUMENTS 10,403,043 B2 *  9/2019  Kaufman .................. G09B 9/30
2001/0044858 A1 * 11/2001  Rekimoto .................. G06F 3/00
710/1

(Continued)

FOREIGN PATENT DOCUMENTS

EP    3039555 A1    7/2016

OTHER PUBLICATIONS

Piekarski et al., Integrating Virtual and Augmented Realities in an Outdoor Application; IEEE; 10 pages. (Year: 2002).*

(Continued)

*Primary Examiner* — Linh K Pham
(74) *Attorney, Agent, or Firm* — Dentons US LLP

(57) ABSTRACT

The present disclosure relates to techniques for displaying an application in a simulated reality setting. The techniques include determining a position of a physical object on a physical surface (or a position of a virtual object on a representation of the physical surface), displaying a representation of an application in a simulated reality setting, and modifying attributes of the representation of the application in response to detecting changes in the position of the physical object on the physical surface (or changes in the position of the virtual object on the representation of the physical surface). In some embodiments, the attributes of the representation of the application are based on the position of the physical object on the physical surface or the position of the virtual object on the representation of the physical surface.

27 Claims, 10 Drawing Sheets

(51) Int. Cl.
*G06T 7/73* (2017.01)
*G06F 3/01* (2006.01)
*G06F 3/0484* (2013.01)
*G06K 9/00* (2006.01)

(58) Field of Classification Search
CPC ...... G06F 3/04845; G06F 3/147; G06F 3/012; G06F 3/0346; G06F 3/013; G06F 3/0481; G06F 3/0487; G06F 3/017; G06F 3/167; G06T 19/006; G06T 2215/16; G06T 13/40; G06T 17/05; G06T 19/20; G06T 15/04; G06T 2219/2016; G06T 2200/04; A63F 2300/8082; G06K 2209/501; G06K 9/00671

See application file for complete search history.

(56) References Cited

U.S. PATENT DOCUMENTS

| | | | | |
|---|---|---|---|---|
| 2012/0124509 | A1* | 5/2012 | Matsuda | G02B 27/017 715/782 |
| 2012/0249741 | A1* | 10/2012 | Maciocci | G06T 15/503 348/46 |
| 2014/0225919 | A1* | 8/2014 | Kaino | H04N 7/183 345/633 |
| 2014/0282220 | A1* | 9/2014 | Wantland | G06F 3/04845 715/782 |
| 2015/0215351 | A1 | 7/2015 | Barzuza et al. | |
| 2015/0235267 | A1* | 8/2015 | Steube | H04N 21/4223 705/14.58 |
| 2015/0302867 | A1* | 10/2015 | Tomlin | G10L 25/78 704/270 |
| 2016/0027216 | A1 | 1/2016 | Da Veiga et al. | |
| 2016/0148433 | A1* | 5/2016 | Petrovskaya | G02B 27/01 345/633 |
| 2017/0061696 | A1* | 3/2017 | Li | G02B 27/017 |
| 2017/0232335 | A1* | 8/2017 | Williams | A63F 13/50 463/31 |
| 2017/0256096 | A1* | 9/2017 | Faaborg | G06T 19/20 |
| 2017/0263056 | A1* | 9/2017 | Leppanen | G06T 19/006 |
| 2017/0344127 | A1* | 11/2017 | Hu | G06F 3/002 |
| 2018/0095607 | A1* | 4/2018 | Proctor | G06F 3/011 |
| 2018/0286126 | A1* | 10/2018 | Schwarz | G06F 3/04845 |
| 2019/0227763 | A1* | 7/2019 | Kaufthal | G06F 3/0482 |
| 2019/0272138 | A1* | 9/2019 | Krauss | G06F 3/013 |
| 2020/0103962 | A1* | 4/2020 | Burns | G06F 3/011 |

OTHER PUBLICATIONS

International Preliminary Report on Patentability received for PCT Patent Application No. PCT/US2018/052748, dated Apr. 9, 2020, 11 pages.
International Search Report and Written Opinion Received for PCT Application No. PCT/US2018/052748, dated Dec. 14, 2018, 12 pages.
The Dynamic Desktop (in the office of the future . . . )—YouTube, Online Available at: https://www.youtube.com/watch?v=m9IZfnRrM4Y, Aug. 20, 2014, 1 page.
Fitzmaurice et al., "Bricks: Laying the Foundations for Graspable User Interfaces", May 7-11, 1995, pp. 442-449.
Regenbrecht et al., "A tangible AR desktop environment", Computers & Graphics, vol. 25, No. 5, Oct. 2001, pp. 755-763.
Shaer et al., "Tangible User Interfaces: Past, Present, and Future Directions", Foundations and Trends? in Human-Computer Interaction, vol. 3, No. 1-2, 2009, pp. 1-137.
Non-Final Office Action received for U.S. Appl. No. 16/552,549, dated Nov. 12, 2020, 15 pages.
Dedual et al., "Creating Hybrid User Interfaces with a 2D Multi-touch Tabletop and a 3D See-Through Head-Worn Display", IEEE International Symposium on Mixed and Augmented Reality, Science and Technology Proceedings, Oct. 26-29, 2011, 2 pages.

* cited by examiner

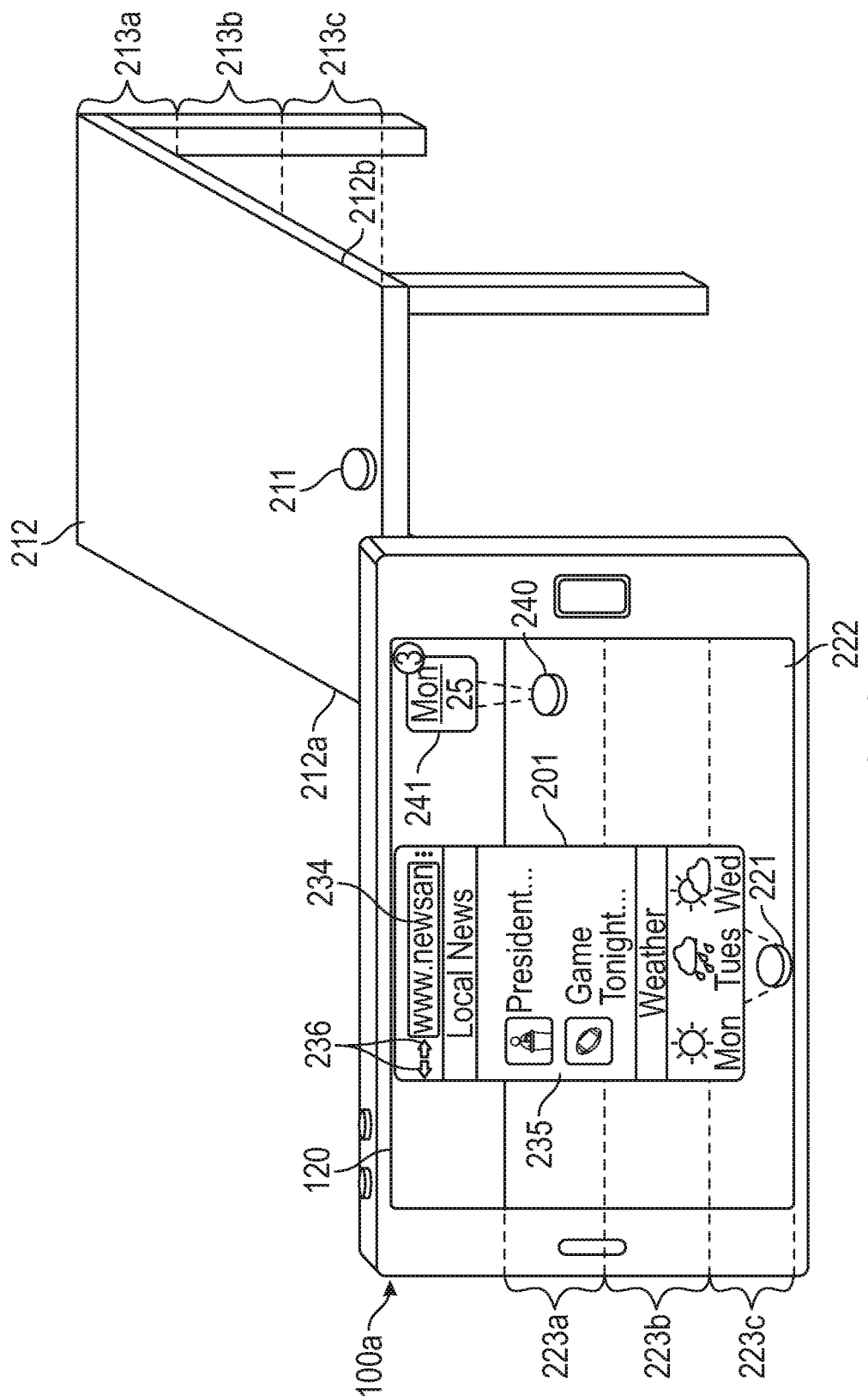

DISPLAYING APPLICATIONS

CROSS-REFERENCE TO RELATED APPLICATIONS

This application is a U.S. National Stage patent application of PCT/US2018/52748, titled "Displaying Applications in a Simulated Reality Setting," filed Sep. 25, 2018, which claims priority to U.S. Provisional Patent Application No. 62/565,741, titled "Displaying Applications in a Mixed-Reality Environment," filed Sep. 29, 2017, the contents of which are incorporated by reference in their entirety.

TECHNICAL FIELD

The present disclosure relates generally to simulated reality settings, and more specifically to representations of electronic products in simulated reality settings.

BACKGROUND

Devices, such as mobile phones, execute computer applications for performing various tasks. Users interact with the computer applications using application user interfaces. For example, users input information into the computer applications using the application user interfaces. For another example, computer applications use the application user interfaces to produce feedback based on received users' input.

SUMMARY

Described herein are techniques for displaying an application in a simulated reality setting. In some embodiments, the techniques include determining a position of a physical object on a physical surface; displaying a representation of an application in a simulated reality setting, wherein one or more attributes of the representation of the application are based on the position of the physical object on the physical surface; and in response to detecting a change in the position of the physical object on the physical surface, modifying the one or more attributes of the representation of the application based on the change in position of the physical object on the physical surface.

In some embodiments, modifying the one or more attributes of the representation of the application comprises modifying the display of the representation of the application based on the change in position of the physical object on the physical surface.

In some embodiments, the one or more attributes comprise an orientation of the representation of the application as displayed in the simulated reality setting with respect to a user; the change in the position of the physical object on the physical surface comprises a rotation of the physical object on the physical surface; and modifying the one or more attributes of the representation of the application based on the change in position of the physical object on the physical surface comprises changing the orientation of the representation of the application based on at least one of a magnitude of the rotation of the physical object on the physical surface or a direction of the rotation of the physical object on the physical surface.

In some embodiments, the one or more attributes comprises a displayed location of the representation of the application; the change in the position of the physical object on the physical surface comprises a change in the physical location of the physical object on the physical surface; and modifying the one or more attributes of the representation of the application based on the change in position of the physical object on the physical surface comprises changing the displayed location of the representation of the application based on at least one of a magnitude of the change in the physical location of the physical object on the physical surface or direction of the change in the physical location of the physical object on the physical surface.

In some embodiments, modifying the one or more attributes of the representation of the application comprises modifying operation of the application; the operation of the application transitions from a primary operational state to a secondary operational state as the position of the physical object moves in a first direction; the operation of the application transitions from the secondary operational state to the primary operational state as the position of the physical object moves in a second direction different from the first direction; while in the primary operational state, the application is enabled to perform a function; and while in the secondary operational state, the application is not enabled to perform the function.

In some embodiments, modifying the one or more attributes of the representation of the application comprises modifying a visual appearance of the representation of the application; the visual appearance of the representation of the application transitions from a primary visual state to a secondary visual state as the position of the physical object moves in a third direction; the visual appearance of the representation of the application transitions from the secondary visual state to the primary visual state as the position of the physical object moves in a fourth direction different from the third direction; while in the primary visual state, the application is enabled to display a visual feature; and while in the secondary visual state, the application is not enabled to display the visual feature.

In some embodiments, determining the position of the physical object on the physical surface comprises determining whether a distance between the physical object and a user exceeds a first predetermined threshold; and modifying the one or more attributes of the representation of the application comprises: in accordance with a determination that the distance between the physical object and the user exceeds the first predetermined threshold, transitioning the application to a first operational state.

In some embodiments, determining the position of the physical object on the physical surface further comprises determining whether the distance between the physical object and the user exceeds a second predetermined threshold; and modifying the one or more attributes of the representation of the application further comprises: in accordance with a determination that the distance between the physical object and the user does not exceed the second predetermined threshold, transitioning the application to a second operational state different than the first operational state; and in accordance with a determination that the distance between the physical object and the user exceeds the second predetermined threshold and does not exceed the first predetermined threshold, transitioning the application to a third operational state different than the first and second operational states.

In some embodiments, determining the position of the physical object on the physical surface comprises determining whether a distance between the physical object and a user exceeds a third predetermined threshold; and modifying the one or more attributes of the representation of the application comprises: in accordance with a determination that the distance between the physical object and the user exceeds the third predetermined threshold, transitioning the representation of the application to a first visual state.

In some embodiments, determining the position of the physical object on the physical surface further comprises determining whether the distance between the physical object and the user exceeds a fourth predetermined threshold; and modifying the one or more attributes of the representation of the application further comprises: in accordance with a determination that the distance between the physical object and the user does not exceed the fourth predetermined threshold, transitioning the representation of the application to a second visual state different than the first visual state; and in accordance with a determination that the distance between the physical object and the user exceeds the fourth predetermined threshold and does not exceed the third predetermined threshold, transitioning the representation of the application to a third visual state different than the first and second visual states.

In some embodiments, the techniques further comprise displaying a virtual representation of the physical object on the physical surface in the simulated reality setting.

In some embodiments, the change in the position of the physical object on the physical surface is detected by a sensor. In some embodiments, the physical object comprises the sensor.

In some embodiments, the representation of the application is displayed having an elevated position above the physical object in the simulated reality setting.

In some embodiments, displaying the representation of the application comprises displaying a virtual user interface for providing input to the application, wherein the displayed virtual user interface is displayed at a location on the physical surface adjacent a user.

In some embodiments, the techniques further comprise while displaying the representation of the application, and prior to modifying the one or more attributes of the representation of the application, detecting a change in the position of the physical object on the physical surface.

In some embodiments, a device for displaying one or more applications in a simulated reality setting includes one or more processors and memory storing one or more programs configured to be executed by the one or more processors. The one or more programs include instructions for determining a position of a physical object on a physical surface; displaying a representation of an application in a simulated reality setting, wherein one or more attributes of the representation of the application are based on the position of the physical object on the physical surface; and in response to detecting a change in the position of the physical object on the physical surface, modifying the one or more attributes of the representation of the application based on the change in position of the physical object on the physical surface.

In some embodiments, a non-transitory (or, optionally, transitory) computer-readable storage medium storing one or more programs configured to be executed by one or more processors displays one or more applications in a simulated reality setting. The one or more programs include instructions for determining a position of a physical object on a physical surface; displaying a representation of an application in a simulated reality setting, wherein one or more attributes of the representation of the application are based on the position of the physical object on the physical surface; and in response to detecting a change in the position of the physical object on the physical surface, modifying the one or more attributes of the representation of the application based on the change in position of the physical object on the physical surface.

BRIEF DESCRIPTION OF THE DRAWINGS

In the following description, reference is made to the accompanying drawings which form a part thereof, and which illustrate several embodiments. Other embodiments may be utilized and structural and operational changes may be made without departing from the scope of the present disclosure. The use of the same reference symbols in different drawings indicates similar or identical items.

FIGS. 2A-2G illustrate embodiments of a device displaying a representation of an application in a simulated reality setting.

DETAILED DESCRIPTION

Figure 1A:
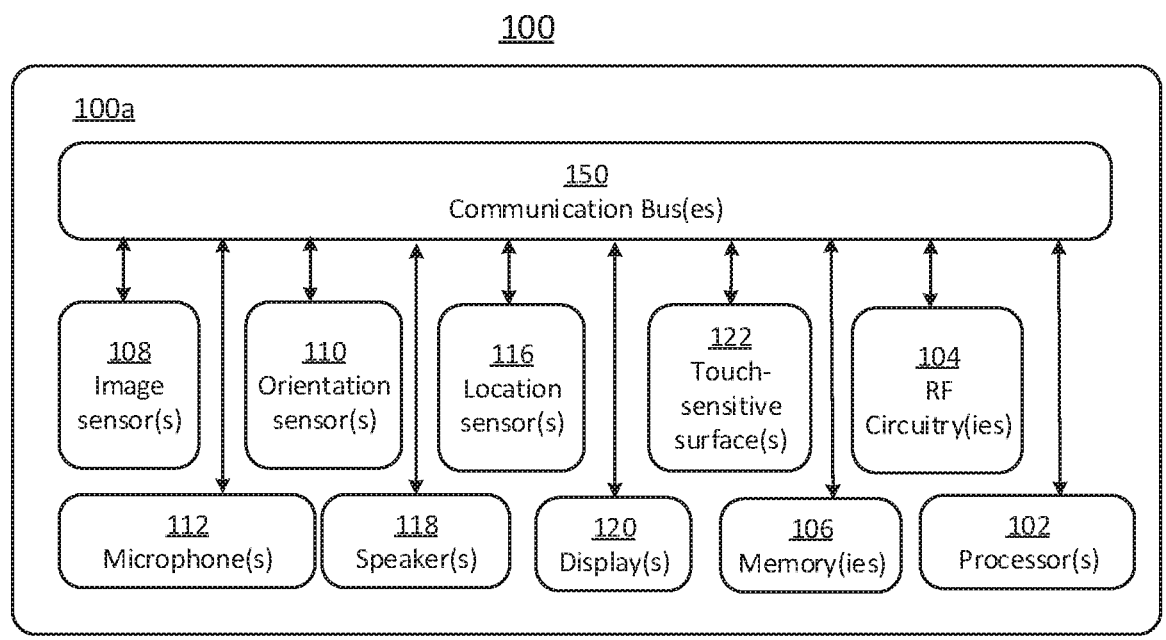
FIGS. 1A-1B depict exemplary systems for use in various computer simulated reality technologies, including virtual reality and mixed reality.

Various embodiments of electronic systems and techniques for using such systems in relation to various simulated reality technologies, including virtual reality and mixed reality (which incorporates sensory inputs from a physical setting), are described. In particular, the present disclosure provides techniques for displaying an application in a simulated reality setting. The techniques include determining a position of a physical object on a physical surface (or a position of a virtual object on a representation of the physical surface), displaying a representation of an application in a simulated reality setting, and modifying attributes of the representation of the application in response to detecting changes in the position of the physical object on the physical surface (or changes in the position of the virtual object on the representation of the physical surface). The attributes of the representation of the application are based on the position of the physical object on the physical surface or the position of the virtual object on the representation of the physical surface. When the position of the physical object or virtual object is changed, one or more attributes of the representation of the application are changed in response to the detected changes in the position of the physical object or virtual object.

In the following description, a physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste. A physical element may also be referred to as a physical object.

In contrast, a simulated reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationary with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

Figure 1B:
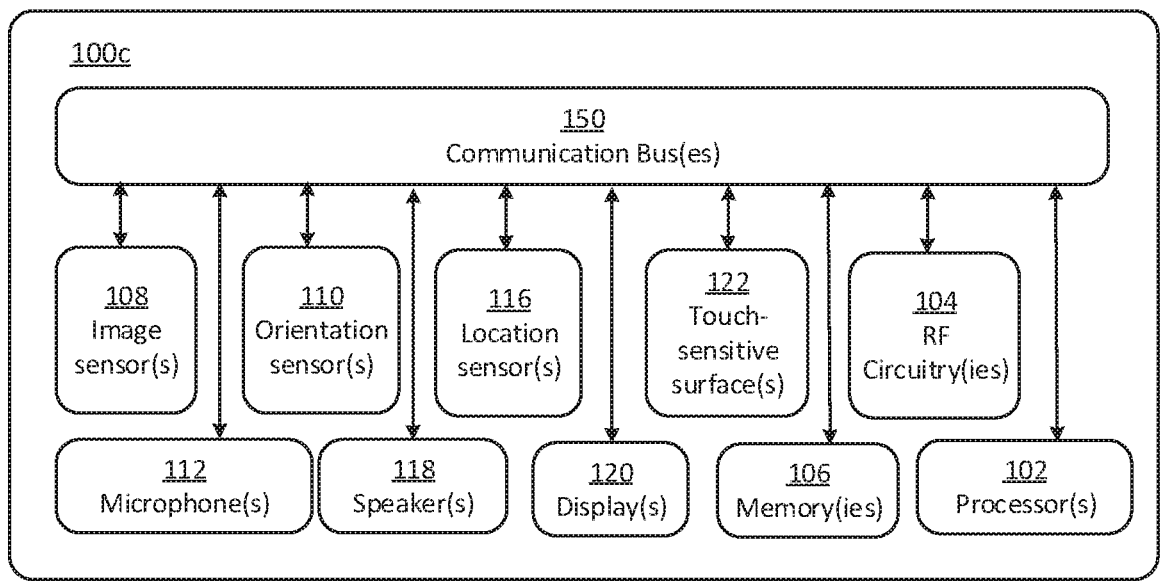
Figure 1B:
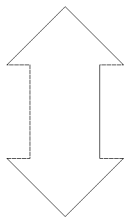
Figure 1B:
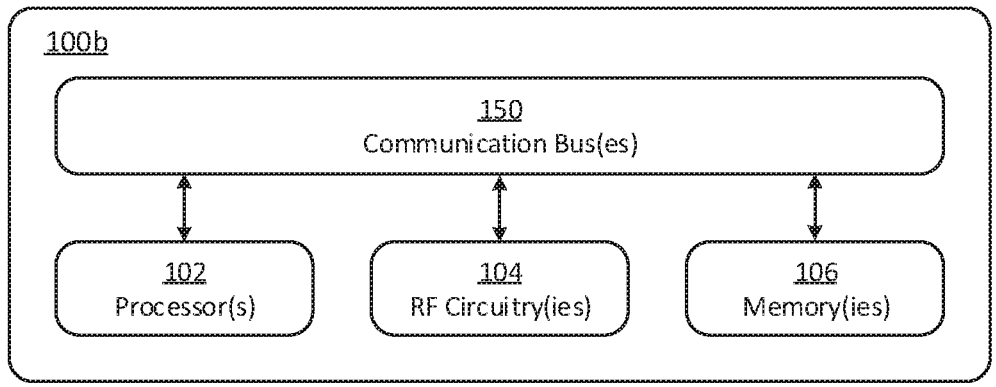

FIG. 1A and FIG. 1B depict exemplary system 100 for use in various simulated reality technologies, including virtual reality and mixed reality.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a second device (e.g., a head-mounted device). In some embodiments, device 100a is implemented in a base station device or a second device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. Display(s) 120 may have an opaque display. Display(s) 120 may have a transparent or semi-transparent display that may incorporate a substrate through which light representative of images is directed to an individual's eyes. Display(s) 120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. Other examples of display(s) 120 include heads up displays, automotive windshields with the ability to display graphics, windows with the ability to display graphics, lenses with the ability to display graphics, tablets, smartphones, and desktop or laptop computers. Alternatively, system 100 may be designed to receive an external display (e.g., a smartphone). In some embodiments, system 100 is a projection-based system that uses retinal projection to project images onto an individual's retina or projects virtual objects into a physical setting (e.g., onto a physical surface or as a holograph).

In some embodiments, system 100 includes touch-sensitive surface(s) 122 for receiving user inputs, such as tap inputs and swipe inputs. In some embodiments, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from a physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 108 also optionally include one or more event camera(s) configured to capture movement of physical objects in the physical setting. Image sensor(s) 108 also optionally include one or more depth sensor(s) configured to detect the distance of physical objects from system 100. In some embodiments, system 100 uses CCD sensors, event cameras, and depth sensors in combination to detect the physical setting around system 100. In some embodiments, image sensor(s) 108 include a first image sensor and a second image sensor. The first image sensor and the second image sensor are optionally configured to capture images of physical objects in the physical setting from two distinct perspectives. In some embodiments, system 100 uses image sensor(s) 108 to receive user inputs, such as hand gestures. In some embodiments, system 100 uses image sensor(s) 108 to detect the position and orientation of system 100 and/or display(s) 120 in the physical setting. For example, system 100 uses image sensor(s) 108 to track the position and orientation of display(s) 120 relative to one or more fixed elements in the physical setting.

In some embodiments, system 100 includes microphones(s) 112. System 100 uses microphone(s) 112 to detect sound from the user and/or the physical setting of the user. In some embodiments, microphone(s) 112 includes an array of microphones (including a plurality of microphones) that optionally operate in tandem, such as to identify ambient noise or to locate the source of sound in space of the physical setting.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the physical setting. Orientation sensor(s) 110 optionally include one or more gyroscopes and/or one or more accelerometers.

Device 100a is capable of supporting a variety of applications, such as one or more of the following: a drawing application, a presentation application, a word processing application, a website creation application, a disk authoring application, a spreadsheet application, a gaming application, a telephone application, a video conferencing application, an e mail application, an instant messaging application, a workout support application, a photo management application, a digital camera application, a digital video camera application, a web browsing application, a digital music player application, a digital video player application, and/or navigation applications.

The various applications include a set of instructions that are executed on device 100a. One or more functions of the device, as well as corresponding information displayed on the device, are, optionally, adjusted and/or varied from one application to the next and/or within a respective application. In this way, a common architecture of the device optionally supports the variety of applications with user interfaces that are intuitive and transparent to the user.

In some embodiments, device 100a facilitates a user's interaction with the applications or other virtual objects by detecting (e.g., using image sensor(s) 108), in the physical setting, gestures or other input from a user. For example, using image sensor(s) 108, device 100a may detect a position, or series of movements, of a user's hand and/or fingers in the physical setting. Device 100a then interprets these detected positions and/or movements of the user's hand and/or fingers as an input (e.g., user input) for interfacing with a virtual object such as a representation of an application displayed in the simulated reality setting. In this way, the device allows a user to interact with the displayed representation of the application, and/or other virtual objects in the simulated reality setting, by performing gestures or motions in the physical setting. The device may also detect (e.g., using image sensor(s) 108) these gestures and/or motions and interpret them as input (e.g., user input) for interacting with physical objects represented on display 120 of device 100a in the simulated reality setting.

FIGS. 2A-2G illustrate various embodiments of device 100a displaying, on display 120, a representation of one or more applications in a simulated reality setting. Device 100a is an embodiment of system 100, as described in reference to FIGS. 1A-1B. In FIGS. 2A-2G, device 100a is shown as a mobile device, such as a mobile phone. It should be understood, however, that device 100a can be any device configured to display a simulated reality setting.

Each representation of an application is a computer-generated user interface (UI) of the application displayed by device 100a on display 120 as a component of the simulated reality setting. Device 100a generates each representation of an application with various attributes such as, for example, the visual appearance of the representation of the application, the displayed orientation of the representation of the application, operation of the application, and the displayed location of the representation of the application. Device 100a determines the various attributes of the representation of the application based on a detected position of a corresponding token relative to a physical object in the physical setting (or relative to a representation of the physical object) such as, for example, a tabletop surface. Thus, in response to detecting (e.g., using image sensor(s) 108) a change in the position of the token, device 100a modifies one or more of the attributes of the representation of the application corresponding to the token, as discussed in greater detail below with respect to FIGS. 2A-2G.

In some embodiments, the visual appearance of the representation of the application includes visual features such as content displayed by the representation of the application, portions of the visual representation of the application itself, or visual aspects of the representation of the application, such as size, color, font, shape, opaqueness, etc. Other embodiments include displayed visual states or objects of the application UI, such as an icon UI, widget UI, full application UI, or window size. In some embodiments, a visual state of a representation of an application is indicated by the displayed visual features, wherein the representation of the application is enabled to display a fewer or greater amount of visual features, depending on the visual state of the representation of the application. For example, when the representation of the application is in a minimized visual state, the representation of the application is displayed as a small object, such as an icon or other visual object (e.g., a window) that represents the associated application and takes up a minimal amount of visual space in the simulated reality setting. In some embodiments, the representation of the application is enabled to display a limited amount of information in the minimized visual state, such as a badge or other data specific to the application that can be displayed in the small visual space of the minimized visual state. In some embodiments, the representation of the application can be displayed in a maximized visual state in which the representation of the application is displayed as a fully formed object (e.g., a full-scale version of the application in its opened state) displayed to take up an amount of visual space in the simulated reality setting that allows the user to fully interact with the application. In some embodiments, the representation of the application is displayed in a limited visual state in which the representation of the application is displayed to take up less visual space in the simulated reality setting than the fully formed object of the maximized state, but slightly more visual space than the small object of the minimized state. In some embodiments, the object displayed in the limited visual state is referred to as a "widget." The widget is enabled to display slightly more information than the minimized visual state of the representation of the application. For example, the widget may display a single, unread message and option for responding to the message when the application is a messaging application. In another embodiment, the widget may display a quote of a single stock when the application is a stock application. In yet another embodiment, the widget may display the weather of a single location when the application is a weather application.

In some embodiments, the displayed orientation of the representation of the application includes an orientation of the representation of the application as displayed in the simulated reality setting relative to an actual location of a user, or an anticipated or expected location of the user. In some embodiments, the location of the user (actual, anticipated, expected, or otherwise) may be approximated based on one or more factors, such as the location or position of device 100a, the location or position of the physical surface, and/or the locations or positions of one or more physical or virtual tokens. In some embodiments, the orientation of the representation of the application is the orientation of the representation of the application as displayed in the simulated reality setting relative to device 100a.

In some embodiments, operation of the application includes the functionality of the application—the degree to which the application is capable of (or enabled for) operating or interacting with a user. In some embodiments, the operation of the application is indicated by the enabled functionality of the application. For example, in some embodiments, the application is in a reduced operational state (e.g., the operability of the application is reduced relative to another operational state) or an increased operational state (e.g., the operability of the application is increased relative to another operational state) depending on whether or not the application is enabled to perform a greater or fewer amount of functions than it was enabled to perform in a previous operational state. One example of a reduced operational state is an inactive state, or minimized operational state, in which the application is not open or active (e.g., the application is not enabled to perform any functions, or is enabled to perform a very limited number of functions such as displaying data). One example of an increased operational state is an active state, or maximized operational state, in which the application is open and provides complete functionality (e.g., the application is enabled to perform all functions intended for that application). Some operational states can be considered either an increased operational state or a reduced operational state depending on how the operational state is evaluated. For example, a limited operational state in which the application is enabled to perform a limited amount of functions (e.g., the application is enabled to function with some capacity greater than the inactive or minimized operational state, but less than the full functional capacity enabled in the maximized operational state) can be considered an increased operational state when compared to the inactive or minimized operational state, but can alternatively be considered a reduced operational state when compared to the active or maximized operational state.

In some embodiments, the displayed location of the representation of the application includes a two-dimensional location, three-dimensional location, and/or orientation of the representation of the application as displayed in the simulated reality setting. In some embodiments, the displayed location of the representation of the application has a two-dimensional location determined with respect to a displayed representation of the physical surface, wherein the two-dimensional location of the representation of the application corresponds to the two-dimensional location of a physical token on the physical surface (or a two-dimensional location of a virtual token on a displayed representation of the physical surface). In some embodiments, the displayed location of the representation of the application has a three-dimensional location, wherein the x- and y-coordinates of the three-dimensional location correspond to the two-dimensional location (x- and y-coordinates) of the physical token on the physical surface (or the two-dimensional location (x- and y-coordinates) of the virtual token on the displayed representation of the physical surface).

It should be appreciated that various attributes may overlap. For example, the displayed orientation or displayed location of the representation of the application may be considered a component of the visual appearance of the representation of the application. Similarly, the displayed orientation of the representation of the application can also be considered a component of the location of the representation of the application.

In some embodiments, such as those illustrated in FIGS. 2A-2G, each representation of an application is displayed positioned above a representation of a corresponding token and having a virtual "tether" 205 providing a visual connection between the representation of the application and the representation of the token. The positioning of the representation of the application above the representation of the token, and the virtual tether 205, each allows a user to more quickly and easily identify corresponding representations of tokens and applications.

In some embodiments, the token is a physical object in the physical setting. In such embodiments, the token is, optionally, displayed in the simulated reality setting as: (1) a representation of the physical object, (2) a virtual object, (3) a combination of a virtual object and a representation of the physical object, or (4) is not displayed at all in the simulated reality setting.

In some embodiments, the token is not a physical object in the physical setting but is, instead, a virtual object displayed in the simulated reality setting. In such embodiments, device 100a may detect one or more inputs (e.g., user inputs) (e.g., gestures) in the physical setting to determine inputs (e.g., user inputs) for interacting with the virtual token. For example, device 100a may display the virtual token at a first displayed location on display 120. Device 100a then detects (e.g., using image sensor(s) 108) a user positioning their finger in the physical setting at a location in front of device 100a that corresponds to the location of the displayed virtual token when viewed on display 120 of device 100a. Device 100a then detects the user moving their finger from the first location in the physical setting to a second location in the physical setting and, in response, displays movement of the displayed representation of the virtual token from the first displayed location to a second displayed location. The second displayed location corresponds to the second location of the user's finger in the physical setting when viewed on display 120 of device 100a. In this embodiment, device 100a moves the virtual token from the first location to the second location in response to detecting gestures of the user's hand and/or fingers in the physical setting.

In the embodiments illustrated in FIGS. 2A-2D and 2F-2G, device 100a detects (e.g., using image sensor(s) 108) physical token 211 positioned on physical tabletop surface 212 and displays, on display 120, representation 221 of the physical token positioned on representation 222 of the physical tabletop surface. Representation 221 of the physical token has a same position with respect to representation 222 of the physical tabletop surface as the position of physical token 211 with respect to physical tabletop surface 212. The device also displays representation 201 of an application corresponding to physical token 211 (and representation 221 of the physical token). One or more attributes of representation 201 of the application are based on the detected position of physical token 211 on tabletop surface 212. In other words, device 100a determines one or more attributes of representation 201 of the application based on a detected position of physical token 211 on tabletop surface 212. Device 100a also modifies one or more attributes of representation 201 of the application in response to detecting a change in the position of the physical token on tabletop surface 212.

Figure 2A:
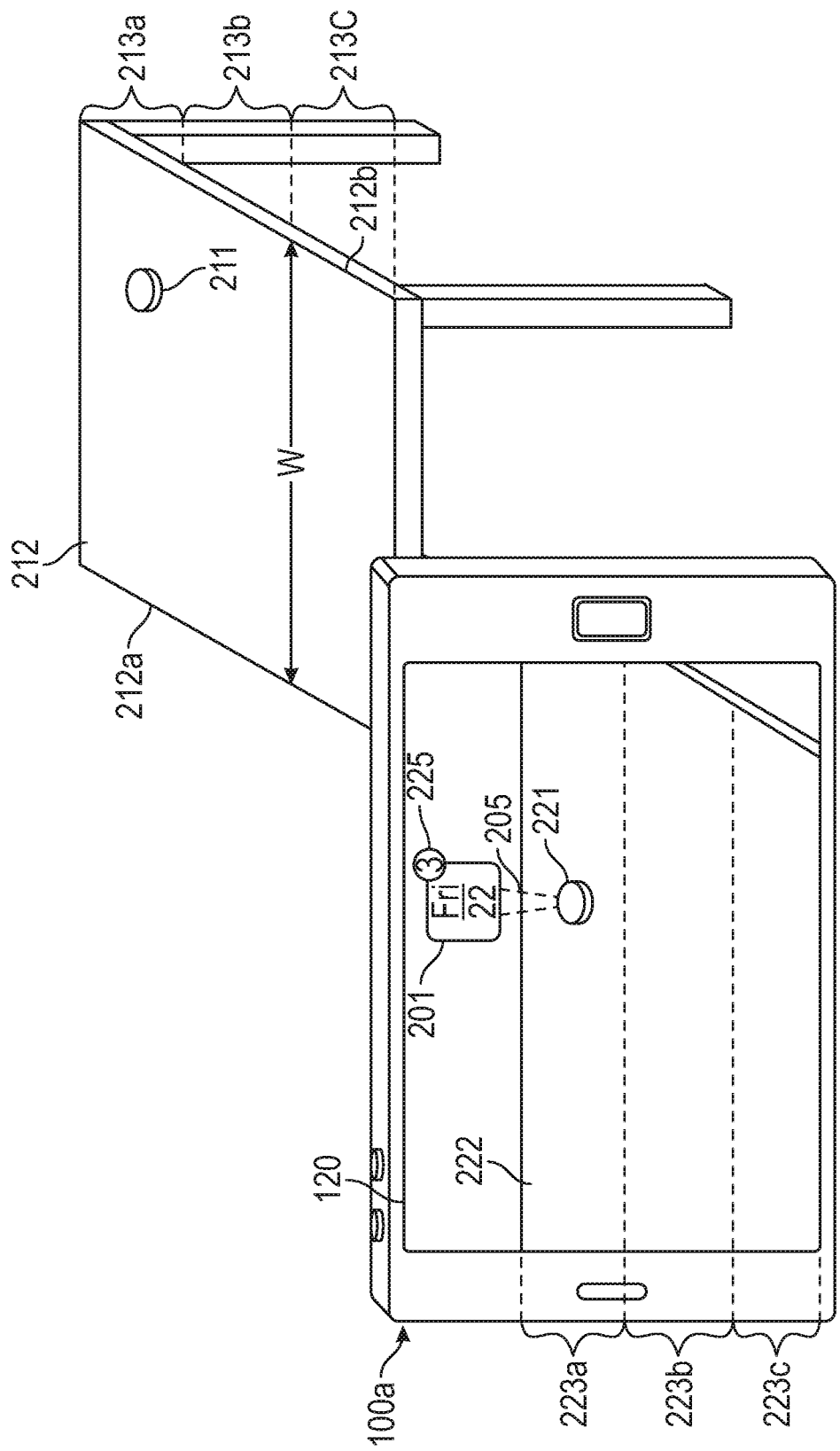

Device 100a is also capable of generating and displaying one or more virtual tokens positioned on representation 222 of the tabletop surface. Examples of such embodiments are shown in FIGS. 2C and 2E. In such embodiments, the device displays a representation of an application corresponding to the virtual token. One or more attributes of the representation of the application are based on device 100a detecting the position of the virtual token with respect to representation 222 of the tabletop surface. Device 100a modifies one or more attributes of the representation of the application in response to detecting a change in the position of the virtual token with respect to representation 222 of the tabletop surface.

In the embodiments illustrated in FIGS. 2A-2G, physical tabletop surface 212 has a width of W extending from left side 212a of tabletop surface 212 to right side 212b of tabletop surface 212, and is shown having regions 213a, 213b, and 213c. Representation 222 of the tabletop surface is shown having dimensions similar to physical tabletop surface 212 and having corresponding representations of regions 223a, 223b, and 223c, respectively. Region 213a (and corresponding region 223a) is a region that is located farthest from device 100a (and, consequently, the user). When a token is positioned in region 213a or corresponding region 223a, which is the region located farthest from the user (or device 100a), device 100a interprets the position of the token in this region as an indication that the user is not seeking to interact with an application associated with the token. In contrast, region 213c (and corresponding region 223c) is a region that is located closest to device 100a. When a token is positioned in region 213c or corresponding region 223c, device 100a interprets the position of the token in this region as an indication that the user has an immediate need or desire to access or interact with an application associated with the token because the user has positioned the token in the region located closest to the user (or device 100a). Region 213b (and corresponding region 223b) is a region that is located between region 213a and 213c (and corresponding regions 223a and 223c). When a token is positioned in region 213b or corresponding region 223b, device 100a interprets the position of the token in this region as an indication that the user has no immediate need or desire to access or interact with an application associated with the token, but may want to have limited interaction with, or access to, the application because the user has positioned the token in an intermediate region from the user that is not as convenient as the closest region (213c or 223c), but also not as distant as the farthest region (213a or 223a).

It should be appreciated that regions 213 and corresponding regions 223 are not limited to the spacing and positions shown in the figures, and can all be different sizes, shapes, and positions than what is shown in the figures. For example, regions 213c can be as shown in FIG. 2A, while regions 213a and 213b can be narrowed to fit in region 213b shown in FIG. 2A. In another embodiment, regions 213 can be positioned on tabletop surface 212 as arcs that radiate concentrically from device 100a. It should also be appreciated that device 100a can display the representations of corresponding regions 223 on display 120 as including markings, highlighting, or some other visual effect to distinguish regions 223 on display 120, thereby allowing the user to more easily and accurately identify regions 223 on representation 222 of the tabletop surface.

In the embodiments discussed below and illustrated in FIGS. 2A-2G, representation 201 of the application is shown transitioning between various visual states and operational states based on the position of token 211. In these various embodiments, the application represented by representation 201 of the application is shown as different types of applications (e.g., messaging applications, calendar applications, web browsing applications, etc.), while the reference numerals (e.g., 201, 221) remain consistent in the figures. It should be understood that the various examples of applications are provided to illustrate the variation in the different attributes, including visual states and operational states, of representation 201 of the application and not, necessarily, that the application itself changes as token 211 is moved among the various positions. The illustrated and described applications and attributes (e.g., visual states and operational states) are not intended to be limiting. Therefore, it should be understood that any application can be represented in any of the visual and operational states shown in the figures and discussed herein. Similarly, each visual and operational state can be used to represent any application, and not just those shown in the figures and discussed herein.

Referring now to the embodiment illustrated in FIG. 2A, device 100a detects (e.g., using image sensor(s) 108) physical token 211 positioned in region 213a of physical tabletop surface 212, approximately 25% of the width W from right side 212b of tabletop surface 212. In response to detecting this position of physical token 211, device 100a displays, on display 120, representation 221 of the physical token having a corresponding two-dimensional position on representation 222 of the physical surface (e.g., approximately 25% from the right edge of representation 222 of the physical surface) in corresponding region 223a, and having representation 201 of the application positioned above representation 221 of the token.

Because device 100a detects the position of physical token 211 as being located in region 213a, which is located farthest from the user, the device determines that the user has no need or desire for accessing or interacting with the application. Accordingly, device 100a displays representation 201 of the application in a minimized visual state (e.g., to minimize obstruction of visual display 120) and reduces the operational state of the application to a minimized (e.g., inactive) operational state (e.g., to conserve system resources such as battery consumption and processing capacity). Device 100a displays representation 201 of the application in a minimized visual state by displaying representation 201 as an icon or other small object that represents the associated application and takes up a minimal amount of visual space on display 120. In some embodiments of a minimized visual state, representation 201 of the application includes one or more badges 225 indicating, for example, a number of unread notifications associated with the corresponding application. For example, in the embodiment illustrated in FIG. 2A, the application is a calendar application, and representation 201 of the calendar application is displayed as an icon for the calendar application that displays the date and includes badge 225 indicating three unread notifications associated with the calendar application.

In the embodiment illustrated in FIG. 2A, device 100a reduces the operational state of the application to a minimized, or inactive, operational state. In the minimized operational state, the application (or representation 201 of the application) provides little or no functionality. For example, the application is not opened or active, but is enabled to provide limited information or functionality by displaying badge 225 and other data (e.g., the current date) that requires minimal processing or functionality of the application.

Figure 2B:
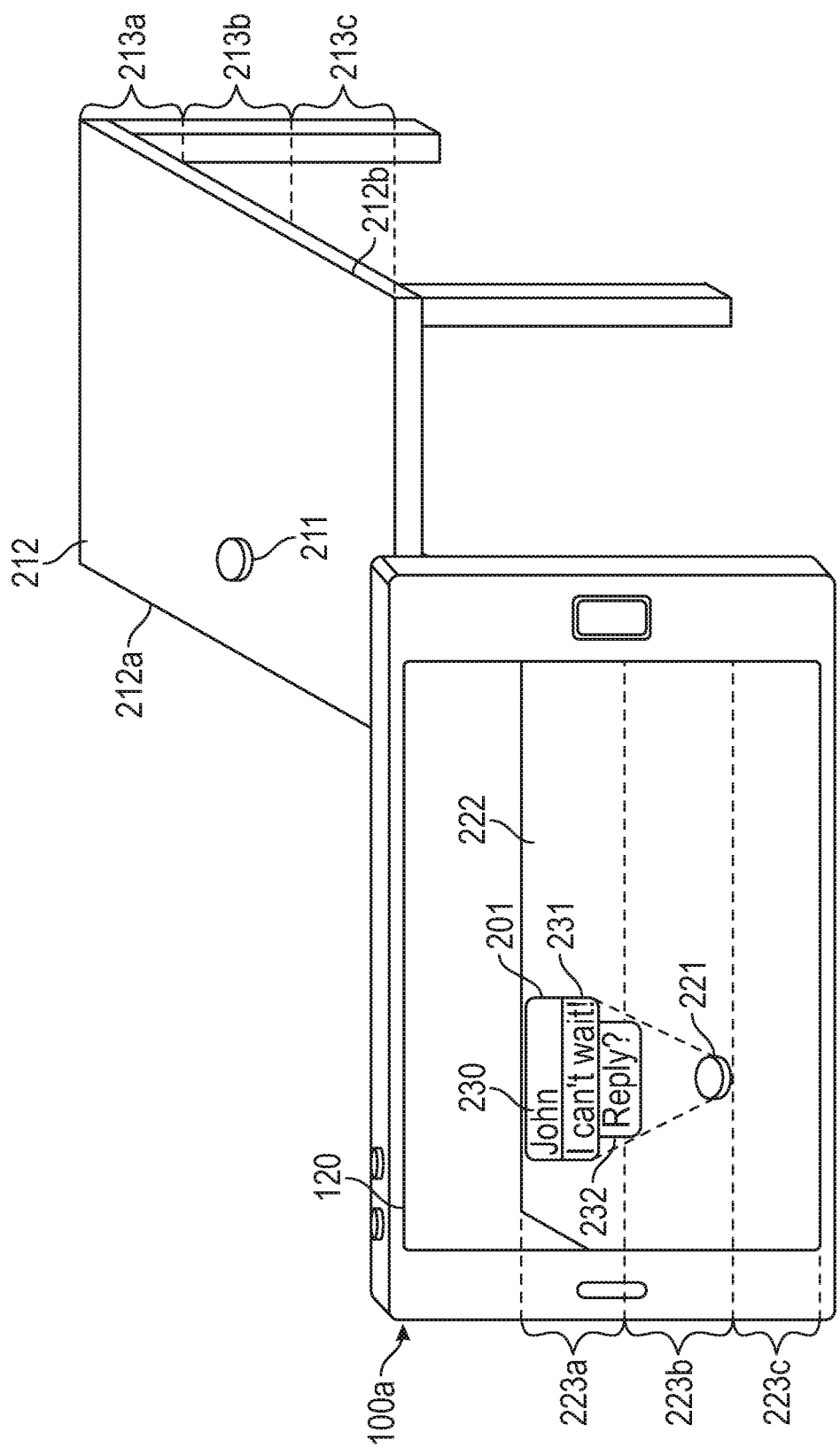

In the embodiment illustrated in FIG. 2B, device 100a detects physical token 211 positioned in region 213b of physical tabletop surface 212, approximately 25% of the width W from left side 212a of tabletop surface 212. In response to detecting this position of physical token 211, device 100a displays, on display 120, representation 221 of the physical token having a corresponding two-dimensional position on representation 222 of the physical surface (e.g., approximately 25% from the left edge of representation 222 of the physical surface) in corresponding region 223b, and having representation 201 of the application positioned above representation 221 of the token.

Because device 100a detects the position of physical token 211 as being located in region 213b, which is an intermediate region from the user, the device determines that the user has no immediate need or desire for accessing or interacting with the application, but may want to have limited interaction with, or access to, the application. Accordingly, device 100a transitions the display of representation 201 of the application to a limited visual state (e.g., to reduce obstruction of visual display 120, while still displaying a greater amount of content or information than in the inactive state) and transitions the operational state of the application to a limited operational state (e.g., to conserve system resources such as battery consumption and processing capacity, while still providing greater functional capacity than in the inactive state). Device 100a displays representation 201 of the application in a limited visual state by displaying representation 201 as a widget or other object that represents the associated application, takes up a smaller amount of visual space on display 120 than the full application UI, and displays a greater amount of content or information than the icon displayed when the application is in the inactive state (shown in FIG. 2A). In some embodiments of a limited visual state, representation 201 of the application includes limited content of the application. For example, in the embodiment illustrated in FIG. 2B, the application is a messaging application, and representation 201 of the messaging application is displayed as a widget UI for the messaging application that displays name 230 of a contact, the latest message 231 (either received from or, optionally, sent to the contact), and a displayed function 232 for accessing the messaging the application (e.g., a reply function for replying to message 231).

In the embodiment illustrated in FIG. 2B, device 100a transitions the operational state of the application to a limited operational state. In the limited operational state, the application (or representation 201 of the application) is enabled to perform a limited amount of functions (e.g., typically a greater number of functions that the minimized operational state, but less than the maximized operational state). For example, in the embodiment illustrated in FIG. 2B, the application is enabled to display contact 230, message 231, and function 232. The application is also enabled to process user input to execute function 232, which in this embodiment, includes processing user input to generate and send a message to contact 230 in response to message 231. In some embodiments, device 100a is capable of processing input (e.g., user input) in the form of a user's gaze (e.g., detected by image sensor(s) 108) and speech (e.g., detected by microphone 112) to execute a reply function, such as that shown in FIG. 2B.

In the embodiment illustrated in FIG. 2C, device 100a detects (e.g., using image sensor(s) 108) physical token 211 positioned in region 213c of the physical tabletop surface 212, approximately halfway between left side 212a and right side 212b of tabletop surface 212. In response to detecting this position of physical token 211, device 100a displays, on display 120, representation 221 of the physical token having a corresponding two-dimensional position on representation 222 of the physical surface (e.g., approximately halfway between the left and right edges of representation 222 of the physical surface) in corresponding region 223c, and having representation 201 of the application positioned above representation 221 of the token.

Because device 100a detects the position of physical token 211 as being located in region 213c, which is located closest to the user, the device determines that the user has an immediate need or desire for accessing or interacting with the application. Accordingly, device 100a transitions the displayed representation 201 of the application to a maximized visual state (e.g., to allow a user to fully interact with the application) and transitions the operational state of the application to a maximized (e.g., active or open) operational state (e.g., to allow the user to fully interact with the application). Device 100a displays representation 201 of the application in a maximized visual state by displaying representation 201 as a full-scale version of the application so that a user can fully interact with the application. For example, in the embodiment illustrated in FIG. 2C, the application is a web browsing application, and representation 201 of the web browsing application is displayed as a full web browsing UI that displays, for example, URL 234, webpage 235, webpage navigation buttons 236, and other features for allowing full user interaction with the web browsing application.

In the embodiment illustrated in FIG. 2C, device 100a transitions the operational state of the application to a maximized, or active, operational state. In the maximized operational state, the application (or representation 201 of the application) provides complete functionality. In other words, the application is enabled to perform all functions intended for that application. For example, the web browsing application in FIG. 2C is enabled to fully operate for its intended purpose, including receiving and processing user input to enable all features and functionality of the web browsing application.

In the embodiment illustrated in FIG. 2C, device 100a also displays, on display 120, virtual token 240 positioned in region 223a of representation 222 of the physical surface. In response to determining this position of virtual token 240, device 100a also displays representation 241 of an application associated with virtual token 240, wherein representation 241 of the application is positioned above virtual token 240. Because the virtual token is located in region 223a, which is located farthest from the user, device 100a determines the user has no need or desire for accessing or interacting with the application and, therefore, displays representation 241 of the application in a minimized visual state and reduces the operational state of the application to a minimized operational state. As shown in FIG. 2C, by displaying representation 241 of the application in the minimized visual state, device 100a is able to conveniently display both representation 201 of the application in the maximized visual state and representation 241 of the application in the minimized state, while minimizing obstruction of the visual space in the simulated reality setting to reduce visual distractions to the user. By reducing the operational state of the application associated with virtual token 240, device 100a is able to conserve system resources, while still allowing a user to fully interact with representation 201 of the application in the maximized operational state.

In some embodiments, device 100a also displays a virtual user interface, which is a computer-generated object displayed in the simulated reality setting for receiving input (e.g., user input) and facilitating user interaction with an application. For example, in FIG. 2D, device 100a displays, on display 120, virtual user interface 250 for receiving user input and facilitating user interaction with representation 201 of the application, which is shown in a maximized visual state and having a maximized operational state in accordance with the above discussion of FIG. 2C. Virtual user interface 250 is displayed on representation 222 of the physical surface at a location convenient to the user, such as region 223c, and having various features for receiving input (e.g., user input). Device 100a detects (e.g., using image sensor(s) 108), user gestures at a location on physical surface 212 corresponding to the displayed location of virtual user interface 250 on representation 222 of the physical surface, and interprets these gestures as input on virtual user interface 250, which device 100a also interprets as input for the application. In some embodiments, the virtual user interface may resemble a virtual keyboard, such as that shown in FIG. 2D, wherein a user may provide input by touching various locations of the virtual keyboard, which are detected by device 100a. In other embodiments, the virtual user interface may resemble a displayed surface similar to a track-pad. In some embodiments, device 100a displays the virtual user interface regardless of the position of the token (e.g., 211) or the displayed and operational states of the corresponding representation (e.g., 201) of the application. In other words, device 100a can display the virtual user interface when physical token 211 is positioned in region 213a, 213b, or 213c of physical surface 212. Similarly, device 100a can display the virtual user interface when a virtual token (e.g., 240) is positioned in region 223a, 223b, or 223c of representation 222 of the physical surface.

In some embodiments, device 100a includes infrared (IR) sensor(s), such as a passive IR sensor or an active IR sensor, for detecting a user touch on physical surface 212. For example, an active IR sensor includes an IR emitter, such as an IR dot emitter, for emitting infrared light into the physical setting. In some embodiments, an IR sensor(s) is included in the physical token (e.g., 211). In some embodiments, the IR sensor(s) is a separate component of system 100 that is positioned, for example, on physical surface 212 for detecting user contact with physical surface 212. An example of such an embodiment is illustrated in FIG. 2E, which shows IR sensor 260 positioned on physical surface 212. Device 100a displays, on display 120, virtual tokens 262, 264, and 266, and representations 263, 265, and 267 of various applications corresponding, respectively, to virtual tokens 262, 264, and 266. Device 100a also displays, optionally, representation 270 of IR sensor 260 on representation 222 of the physical surface. In this embodiment, IR sensor 260 is positioned in the center of physical surface 212 so that IR sensor 260 can detect user contact with physical surface 212 (e.g., for interacting with virtual tokens 262, 264, and 266) in any direction from IR sensor 260. In accordance with the other embodiments discussed herein, it should be understood that the attributes of representations 263, 265, and 267 of the applications are determined based on the detected positions of respective virtual tokens 262, 264, and 266 on representation 222 of the physical surface, similar to the way in which the attributes of representation 201 of the application are determined based on the detected position of physical token 211 on physical surface 212.

In the embodiments discussed herein, device 100a modifies one or more attributes of the representation (e.g., 201) of the application based on detecting a change in the position of the physical token (e.g., 211) on the physical surface (e.g., 212), or based on detecting a change in the position of a virtual token (e.g., 240, 262, 264, 266) on the representation (e.g., 222) of the physical surface. In some embodiments, the change in position of the token may include a rotation of the token, and the corresponding change in attribute includes a change in the displayed orientation of the representation of the application corresponding to the rotated token. An example of such an embodiment is illustrated in FIGS. 2F and 2G, which show token 211 having indicia 275 positioned facing front side 212c of physical surface 212 in FIG. 2F, and rotated counterclockwise approximately 45 degrees toward right side 212b of physical surface 212 in FIG. 2G.

Figure 2D:
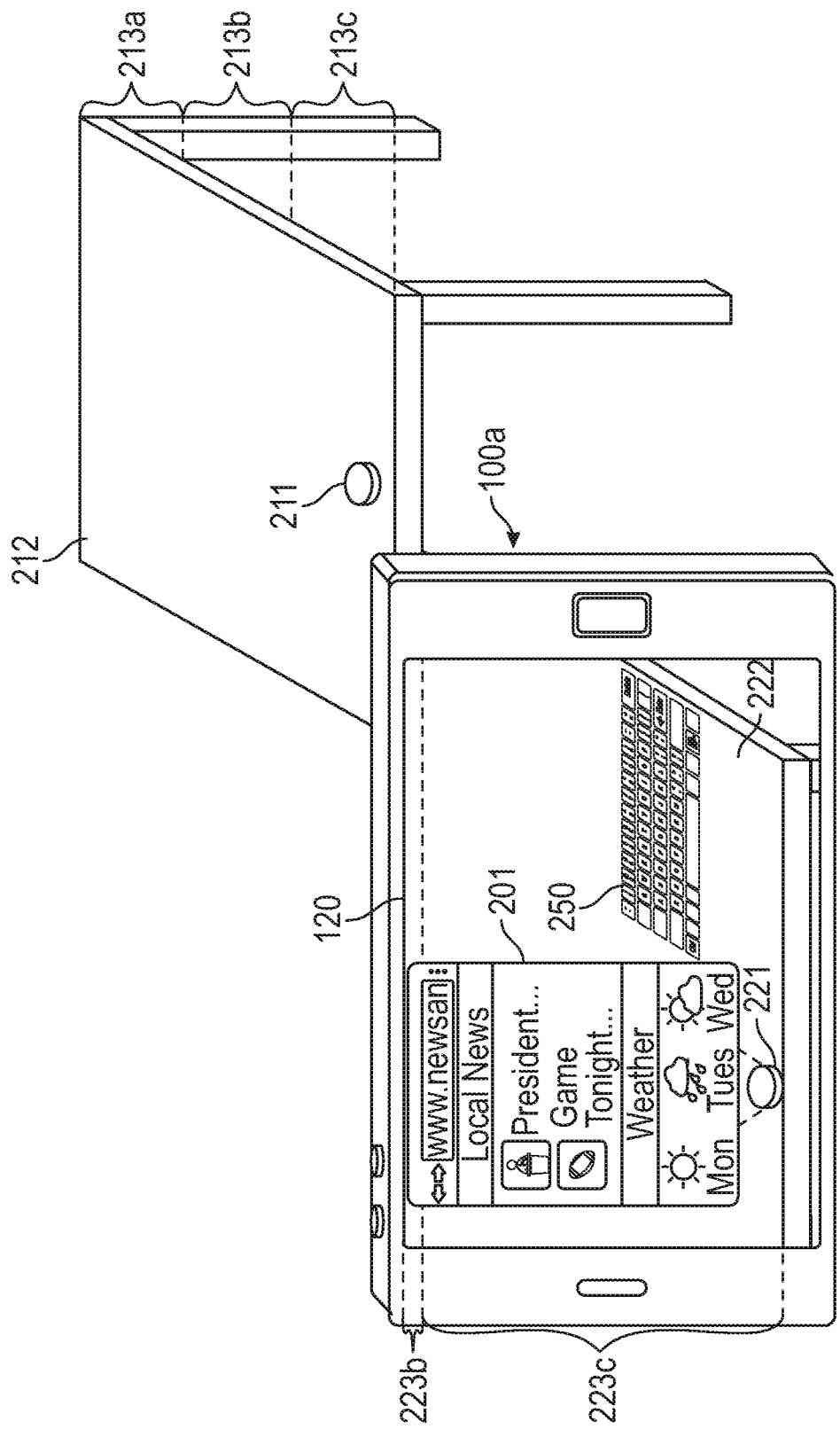
Figure 2E:
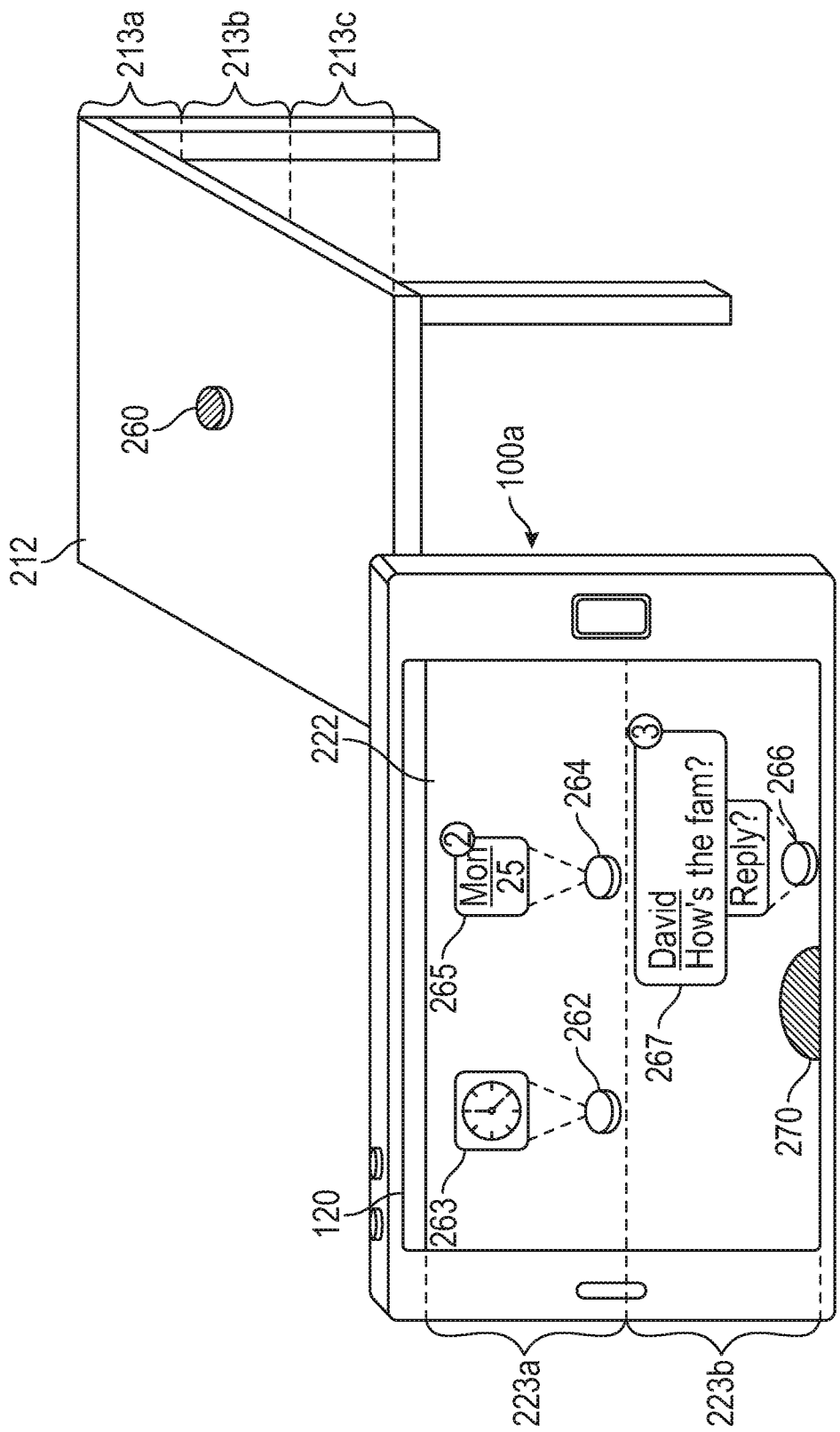
Figure 2F:
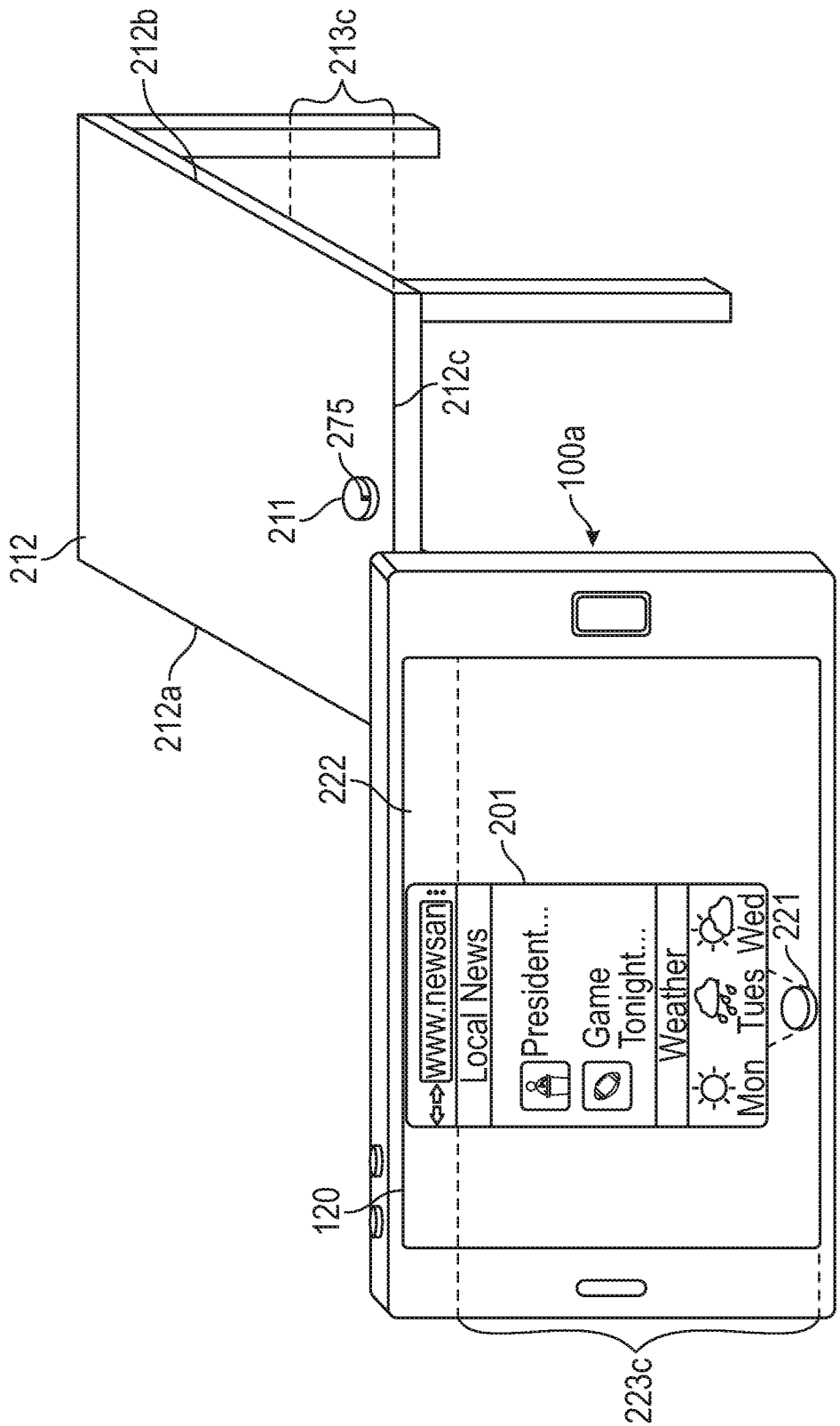

In FIG. 2F, device 100a detects the position of token 211 with indicia 275 facing front side 212c of physical surface 212, and device 100a displays representation 201 of the application having a displayed orientation facing towards a corresponding front side (not shown) of representation 222 of the physical surface. In FIG. 2G, device 100a detects rotation of token 211 by about 45 degrees in a counterclockwise direction and, in response, rotates the displayed orientation of representation 201 of the application approximately 45 degrees in a counterclockwise direction to match the rotation of token 211. In the embodiment illustrated in FIGS. 2F and 2G, device 100a is described as modifying the displayed orientation of representation 201 of the application relative to representation 222 of the physical surface, specifically, a front side of representation 222 of the physical surface, which also corresponds to the position of device 100a. In other words, the relative positions of the front side of representation 222 of the physical surface and device 100a, are the same in the embodiment illustrated in FIGS. 2F and 2G. In some embodiments, however, device 100a modifies the displayed orientation of representation 201 of the application with respect to the perspective of device 100a, and not necessarily with respect to representation 222 of the physical surface, even though those two perspectives can be consistent with each other.

Figure 2G:
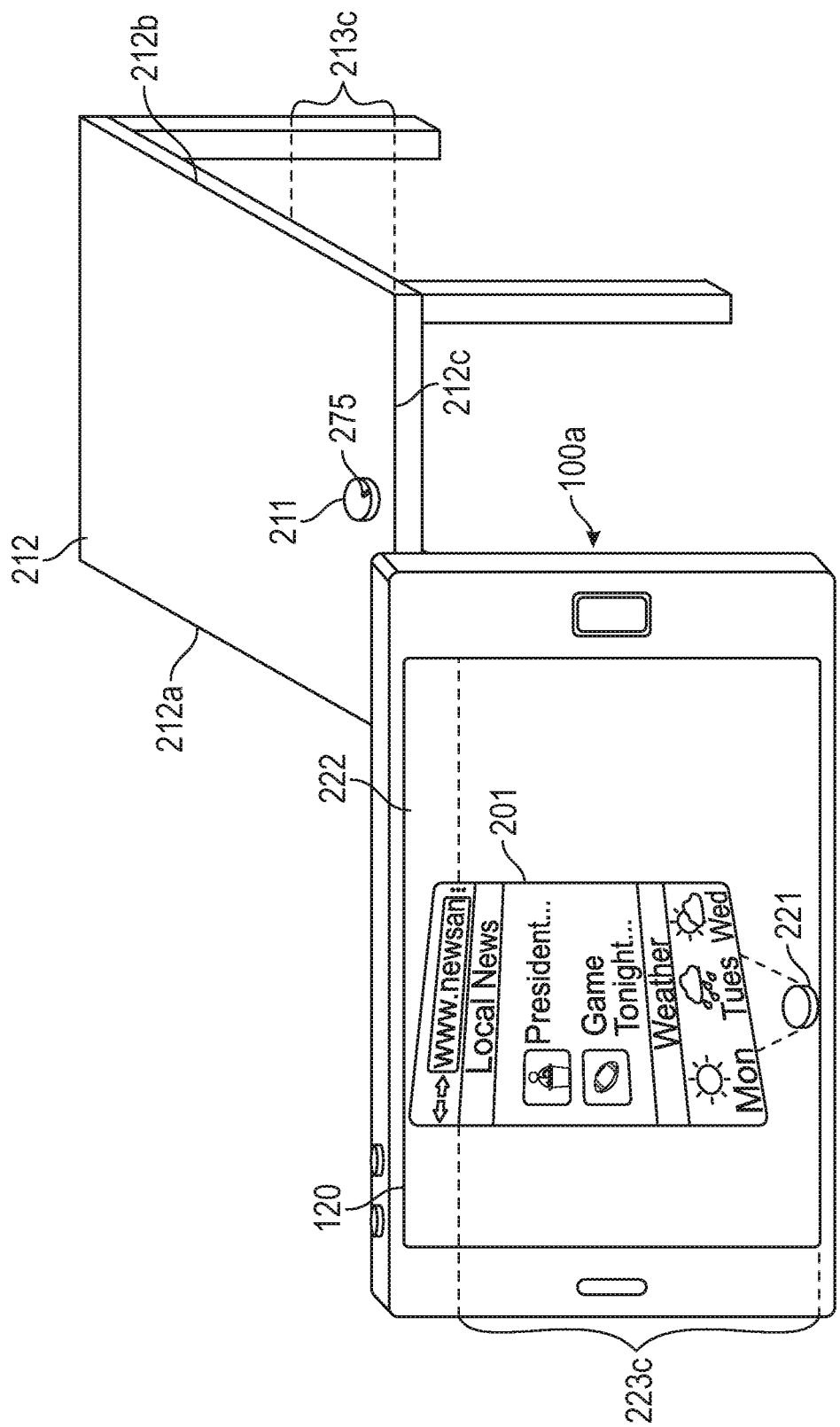

Although the embodiment illustrated in FIGS. 2F and 2G shows device 100a modifying the displayed orientation of representation 201 of the application in response to detecting side-to-side rotation of token 211 in a counterclockwise direction, it should be appreciated that device 100a may change the orientation of representation 201 of the application in response to other detected changes in orientation of token 211. For example, in some embodiments, the device may adjust the orientation of representation 201 of the application in an up-or-down direction in response to detecting an up-or-down rotation of token 211.

Figure 3:
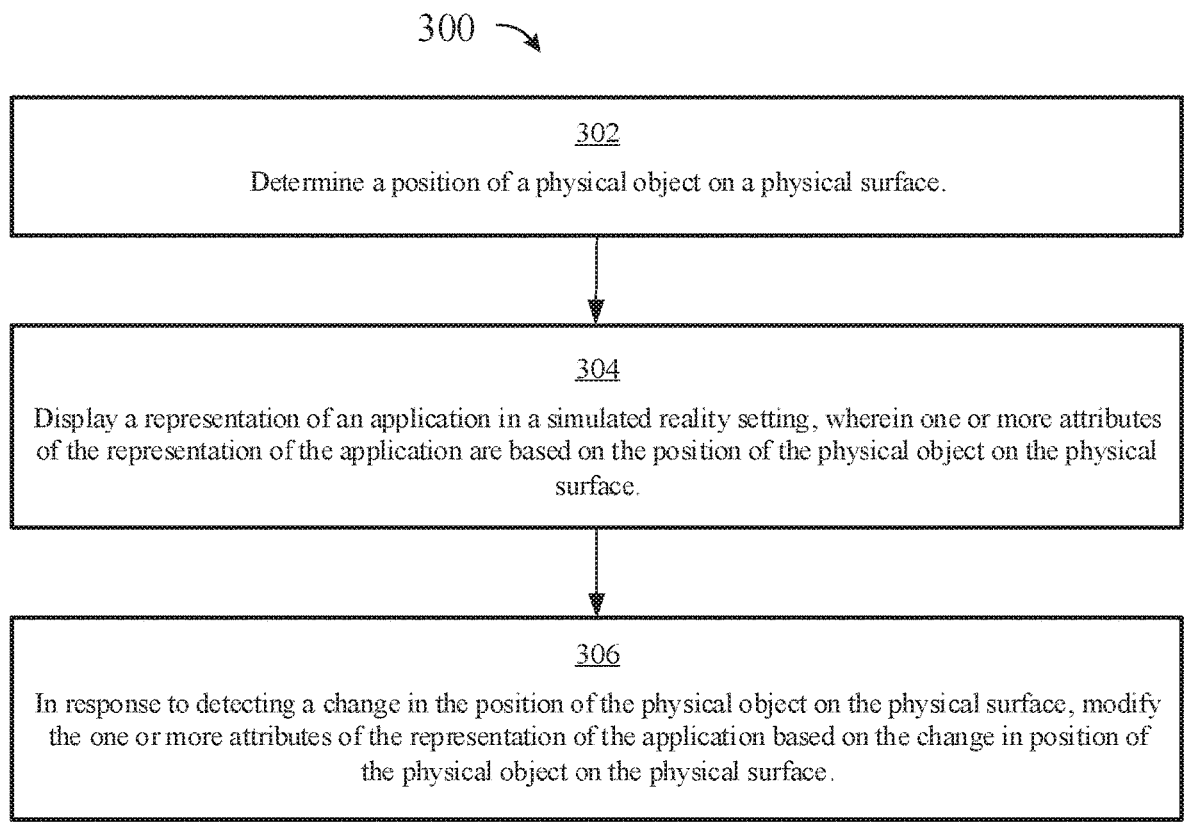
FIG. 3 depicts an exemplary technique for displaying one or more applications in a simulated reality setting.

FIG. 3 depicts an exemplary technique 300 for displaying one or more applications in a simulated reality setting. In some embodiments, the technique is carried out by system 100 described in reference to FIGS. 1A-1B and 2A-2G.

At block 302, the device (e.g., 100a) determines a position (e.g., two-dimensional location, three-dimensional location, and/or orientation) of a physical object (e.g., a token 211 that is a physical object from the physical setting that is visible in the simulated reality setting) on a physical surface (e.g., a tabletop surface 212 in the physical setting). In some embodiments, the physical surface is visible in the simulated reality setting. In some embodiments, the physical object is a predefined physical object such as a physical token having a particular design or shape (e.g., hemi-sphere, cylinder, puck). In some embodiments, the physical object is not an electronic device, or alternatively, lacks a CPU, memory, and/or communication circuitry (e.g., wireless communication circuitry). In some embodiments, the physical object can be represented as a virtual object that is computer generated and displayed in the simulated reality setting. In some embodiments, the token is not a physical object but is, instead, a virtual object (e.g., 240, 262, 264, 266) that is computer generated and displayed in the simulated reality setting.

At block 304, the device (e.g., 100a) displays a representation (e.g., representation 201, the computer-generated UI of the application displayed as a component of the simulated reality setting) of an application in a simulated reality setting. One or more attributes of the representation of the application are based on the position of the physical object (e.g., token 211) on the physical surface (e.g., 212). The attributes include, for example, visual appearance (e.g., full application UI, widget UI, icon UI, window size), orientation of the representation of the application, operation of the application (e.g., full operation, limited operation, no operation), and displayed location of the representation of the application in the simulated reality setting. Thus, the representation of the application has different appearances and/or operation when the token is positioned in different locations on the physical surface, and has a displayed orientation that changes with rotation of the token.

In some embodiments, the representation (e.g., 201) of the application is displayed having an elevated position above the physical object (e.g., representation 201 of the application is floating above representation 221 of the physical object) in the virtual simulated reality setting. In some embodiments, the representation of the application is displayed having a visual connection to the representation of the token. In some embodiments, the visual connection includes a virtual tether (e.g., 205) connecting the displayed representation of the application to representation 221 of the token.

In some embodiments, displaying the representation (e.g., 201) of the application comprises displaying a virtual user interface (e.g., 250) for providing input (e.g., user input) to the application. The displayed virtual user interface is displayed, in some embodiments, at a location on the physical surface (e.g., at region 223c of representation 222 of the physical surface as shown in FIG. 2D) adjacent a user (e.g., an actual location of the user, an anticipated or expected location of the user, or a location of device 100a). In some embodiments, the user is capable of providing user input to the application by interacting with the virtual user interface. In some embodiments, the virtual user interface is a computer-generated surface displayed on representation 222 of the physical surface in the simulated reality setting.

In response to detecting a change in the position of the physical object on the physical surface, the device (e.g., 100a) modifies, at block 306, the one or more attributes (e.g., display (visual appearance, orientation, location of the representation (e.g., 201) of the application) and operation of the application) of the representation (e.g., 201) of the application based on the change in position of the physical object (e.g., token 211) on the physical surface (e.g., tabletop 212). In some embodiments, the device changes the representation of the application in response to detecting a change in the physical position of the token (e.g., 211). In some embodiments, the device changes the orientation of the representation of the application (e.g., as shown in FIGS. 2F and 2G) in response to detecting rotation of the token. In some embodiments, the device changes the location of the displayed representation (e.g., 201) of the application in the simulated reality setting in response to detecting a change in the physical location of the token on the physical surface. In some embodiments, the device changes the appearance of the UI of the application (e.g., the representation 201 of the application) displayed in the simulated reality setting in response to detecting a change in the location of the token on the physical surface. In some embodiments, the device changes the operation of the application displayed in the simulated reality setting in response to detecting a change in the location of the token on the physical surface.

In some embodiments, modifying the one or more attributes of the representation of the application comprises modifying the display of the representation (e.g., 201) of the application based on the change in position of the physical object (e.g., 211) on the physical surface (e.g., 212). In some embodiments, this includes modifying the visual appearance, orientation, or location of the representation of the application as displayed in the simulated reality setting.

In some embodiments, the one or more attributes comprise an orientation of the representation (e.g., 201) of the application as displayed in the simulated reality setting with respect to a user (e.g., an orientation of the representation of the application as displayed in the simulated reality setting relative to an actual location of the user, an anticipated or expected location of the user (e.g., based on a perspective of the image data displayed on display 120 of device 100a), or a location of the device (e.g., 100a)). The change in the position of the physical object (e.g., 211) on the physical surface (e.g., 212) comprises a rotation of the physical object on the physical surface. For example, a rotation as shown in FIGS. 2F and 2G of the physical object about an axis of rotation (e.g., x-axis or y-axis) extending through the physical object. In some embodiments, modifying the one or more attributes of the representation of the application based on the change in position of the physical object on the physical surface comprises changing the orientation of the representation of the application based on at least one of a magnitude (e.g., 45 degrees as shown in FIG. 2G) of the rotation of the physical object on the physical surface or a direction (e.g., counterclockwise as shown in FIG. 2G) of the rotation of the physical object on the physical surface.

For example, when the physical object (e.g., 211) is rotated about the axis of rotation (e.g., an x- or y-axis), the representation (e.g., 201) of the application is rotated in a direction that corresponds to the direction of rotation of the physical object and by a magnitude that corresponds to the magnitude of rotation of the physical object. In some embodiments, rotating the physical object about an x-axis includes rotating the physical object in an up-or-down motion. In some embodiments, rotating the physical object about a y-axis includes rotating the physical object side-to-side. In some embodiments, the magnitude of rotation is a degree of rotation (e.g., 45 degrees) about the axis of rotation. In some embodiments, the magnitude of rotation is limited to a set range of rotation about the axis of rotation. In some embodiments, the magnitude of rotation of the representation of the application is a magnitude that is scaled (e.g., dampened or amplified) relative to the magnitude of rotation of the physical object. In some embodiments, the direction of rotation of the representation of the application is the same as the direction of rotation of the physical object (e.g., the physical object rotates clockwise and the representation of the application also rotates clockwise). In some embodiments, the direction of rotation of the representation of the application is opposite the direction of rotation of the physical object (e.g., the physical object rotates clockwise, and the representation of the application rotates counterclockwise).

In some embodiments, the one or more attributes comprises a displayed location of the representation (e.g., 201) of the application (e.g., a location of the representation of the application as displayed in the simulated reality setting). The change in the position of the physical object (e.g., 211) on the physical surface (e.g., 212) comprises a change in the physical location of the physical object on the physical surface (e.g., a change in the two-dimensional location of the physical object on the physical surface). In some embodiments, modifying the one or more attributes of the representation of the application based on the change in position of the physical object on the physical surface comprises changing the displayed location of the representation of the application based on at least one of a magnitude of the change in the physical location of the physical object on the physical surface or direction of the change in the physical location of the physical object on the physical surface.

For example, when the physical object (e.g., 211) is moved from a first location on the physical surface (e.g., 212) to a second location on the physical surface (e.g., a two-dimensional movement on the physical surface represented by a movement from a first two-dimensional coordinate corresponding to the first location of the physical object on the physical surface to a second two-dimensional coordinate corresponding to the second location of the physical object on the physical surface), the displayed representation (e.g., 201) of the application is moved from its initial displayed location in the simulated reality setting to a different displayed location in the simulated reality setting. The movement of the displayed representation of the application is in a direction that corresponds to the direction of movement of the physical object on the physical surface and by a magnitude (e.g., distance and/or velocity) that corresponds to the magnitude (e.g., distance and/or velocity) of the movement of the physical object on the physical surface. In some embodiments, the magnitude of the movement of the physical object includes the physical distance between the first location of the physical object (e.g., the two-dimensional coordinate corresponding to the first location of the physical object on the physical surface) and the second location of the physical object (e.g., the two-dimensional coordinate corresponding to the second location of the physical object on the physical surface). In some embodiments, the magnitude of the movement of the physical object includes a velocity of the movement of the physical object from the first location to the second location. In some embodiments, the magnitude of the movement of the displayed representation of the application is a magnitude that is scaled (e.g., dampened or amplified) relative to the magnitude of the movement of the physical object. In some embodiments, the direction of the movement of the displayed representation of the application is the same as the direction of movement of the physical object (e.g., the physical object moves left, and the displayed representation of the application also moves left). In some embodiments, the direction of movement of the displayed representation of the application is opposite the direction of movement of the physical object (e.g., the physical object moves left, and the displayed representation of the application moves right).

In some embodiments, modifying the one or more attributes of the representation (e.g., 201) of the application comprises modifying operation (e.g., functionality, the degree to which the application is capable of operating or interacting with the user) of the application. The operation of the application transitions from a primary operational state (e.g., an increased operational state such as that shown in FIG. 2C or, in some embodiments, shown in FIG. 2B) to a secondary operational state (e.g., a reduced operational state such as that shown in FIG. 2A or, in some embodiments, shown in FIG. 2B), as the position of the physical object moves in a first direction. For example, the first direction can be a direction away from an actual location of the user, or from an anticipated or expected location of the user, or away from device 100a (e.g., from region 213b to region 213a, or from region 213c to 213b). The operation of the application transitions from the secondary operational state to the primary operational state as the position of the physical object moves in a second direction different from the first direction. For example, the second direction can be a direction towards an actual location of the user, towards an anticipated or expected location of the user, or towards the device (e.g., from region 213a to region 213b, or from region 213b to region 213c). While in the primary operational state, the application is enabled to perform a function (e.g., process a user input), and while in the secondary operational state, the application is not enabled to perform the function (e.g., process a user input.). In some embodiments, the application provides greater functionality in the primary operational state than in the secondary operational state. In some embodiments, the application is enabled to process more data in the primary operational state than in the secondary operational state. In some embodiments, the application is enabled to interact more with the user in the primary operational state than in the secondary operational state. In some embodiments, the application provides less functionality in the secondary operational state than in the primary operational state. In some embodiments, the application is enabled to process less data in the secondary operational state than in the primary operational state. In some embodiments, the application is enabled to interact less with the user in the secondary operational state than in the primary operational state.

In some embodiments, modifying the one or more attributes of the representation of the application comprises modifying a visual appearance (e.g., full application UI, widget UI, icon UI, window size) of the representation (e.g., 201) of the application. The visual appearance of the representation of the application transitions from a primary visual state (e.g., such as that shown in FIG. 2C or, in some embodiments, shown in FIG. 2B) to a secondary visual state (e.g., such as that shown in FIG. 2A or, in some embodiments, shown in FIG. 2B) as the position of the physical object moves in a third direction. For example, the third direction may be a direction away from an actual location of the user, from an anticipated or expected location of the user, or away from device 100a (e.g., from region 213c to region 213b, or from region 213b to region 213a). In some embodiments, the third direction is the first direction. The visual appearance of the representation of the application transitions from the secondary visual state to the primary visual state as the position of the physical object moves in a fourth direction different from the third direction. For example, the fourth direction may be a direction towards an actual location of the user, towards an anticipated or expected location of the user, or towards device 100a (e.g., from region 213a to region 213b, or from region 213b to region 213c). In some embodiments, the fourth direction is the second direction. While in the primary visual state, the application is enabled to display a visual feature, and while in the secondary visual state, the application is not enabled to display the visual feature. The visual feature may include, for example, a portion of the displayed representation of the application such as content displayed in the representation of the application, portions of the visual representation of the application itself, or visual aspects of the representation of the application such as size, color, opaqueness, etc. In some embodiments, while in the primary visual state, the visual appearance of the representation of the application, as displayed in the simulated reality setting, includes at least one of an increased size or increased amount of content than while in the secondary visual state. In some embodiments, while in the secondary visual state, the visual appearance of the representation of the application, as displayed in the simulated reality setting, includes at least one of a decreased size or decreased amount of content than while in the primary visual state.

In some embodiments, determining the position of the physical object (e.g., 211) on the physical surface (e.g., 212) comprises determining whether a distance between the physical object and a user (e.g., an actual location of the user, an anticipated or expected location of the user, or a location of device 100a) exceeds a first predetermined threshold. In some embodiments, the first predetermined threshold corresponds to a distance sufficient to determine the physical object is located in a region (e.g., 213a) on the physical surface located farthest from the user or device. In some embodiments, modifying the one or more attributes of the representation of the application comprises: in accordance with a determination that the distance between the physical object and the user (e.g., device 100a) exceeds the first predetermined threshold, transitioning the application to a first operational state. For example, when the physical object (e.g., token 211) is located in the region on the physical surface (e.g., 212) located farthest from the user (e.g., region 213a), the application transitions to an operational state that provides little or no functionality such as that shown in FIG. 2A. In some embodiments, the first operational state is a minimized operational state in which the application does not process user input.

In some embodiments, determining the position of the physical object (e.g., 211) on the physical surface (e.g., 212) further comprises determining whether the distance between the physical object and the user (e.g., an actual location of the user, an anticipated or expected location of the user, or a location of device 100a) exceeds a second predetermined threshold. In some embodiments, the second predetermined threshold corresponds to a distance sufficient to determine the physical object is located in a region (e.g., 213c) on the physical surface located closest to the user or device. In some embodiments, modifying the one or more attributes of the representation of the application further comprises: in accordance with a determination that the distance between the physical object and the user (or device) does not exceed the second predetermined threshold, transitioning the application to a second operational state different than the first operational state. For example, when the physical object is located in the region on the physical surface located closest to the user (e.g., region 213c), the application transitions to an operational state that provides complete functionality such as that shown in FIG. 2C. In accordance with a determination that the distance between the physical object and the user exceeds the second predetermined threshold and does not exceed the first predetermined threshold, the application is transitioned to a third operational state different than the first and second operational states. For example, when the physical object is located in an intermediate region (e.g., region 213b) on the physical surface located between the region farthest from the user and the region closest to the user, the application transitions to an operational state that provides limited functionality such as that shown in FIG. 2B. In some embodiments, the second operational state is a maximized operational state in which the application is capable of functioning at full capacity or without limiting features of the application. In some embodiments, the third operational state is a limited operational state in which the application is capable of functioning with some capacity (greater than no functionality), but less than at full capacity. In some embodiments, the limited functionality includes processing limited user inputs such as user inputs provided using at least one of speech or gaze (a detected location of the user's eye). For example, in some embodiments (e.g., FIG. 2B), the application is a messaging application and, when the application is in the limited operational state, the messaging application can display a received message (e.g., 231) and process user input provided by speech and detected eye movement to send a response to the received message, but cannot process the full range of user input that is provided when the application is in the maximized operational state.

In some embodiments, determining the position of the physical object (e.g., 211) on the physical surface (e.g., 212) comprises determining whether a distance between the physical object and a user (e.g., an actual location of the user, an anticipated or expected location of the user, or a location of device 100a) exceeds a third predetermined threshold. In some embodiments, the third predetermined threshold corresponds to a distance sufficient to determine the physical object is located in a region (e.g., 213a) on the physical surface located farthest from the user or device. In some embodiments, the third predetermined threshold is the first predetermined threshold. In some embodiments, modifying the one or more attributes of the representation of the application comprises: in accordance with a determination that the distance between the physical object and the user (or device) exceeds the third predetermined threshold, transitioning the representation of the application to a first visual state. For example, when the physical object is located in the region on the physical surface located farthest from the user (e.g., region 213a), the representation of the application is displayed as a small object such as an icon or other visual object, such as a window, that takes up a minimal amount of visual space in the simulated reality setting as shown in FIG. 2A. In some embodiments, the first visual state is a minimized visual state in which the representation of the application includes a minimal amount of information displayed in the simulated reality setting. In some embodiments, the representation of the application includes badges (e.g., badge 225 indicating a number of unread notifications), when the representation of the application is in the minimized visual state. In some embodiments, such as that shown in FIG. 2A, the application is a calendar application and the information displayed in the minimized visual state of the representation of the application is the date.

In some embodiments, determining the position of the physical object (e.g., 211) on the physical surface (e.g., 212) further comprises determining whether the distance between the physical object and the user (e.g., an actual location of the user, an anticipated or expected location of the user, or a location of device 100a) exceeds a fourth predetermined threshold. In some embodiments, the fourth predetermined threshold corresponds to a distance sufficient to determine the physical object is located in a region (e.g., 213c) on the physical surface located closest to the user or device. In some embodiments, the fourth predetermined threshold is the second predetermined threshold. In some embodiments, modifying the one or more attributes of the representation of the application further comprises: in accordance with a determination that the distance between the physical object and the user does not exceed the fourth predetermined threshold, transitioning the representation of the application to a second visual state different than the first visual state. For example, when the physical object is located in the region on the physical surface located closest to the user, the representation of the application is displayed as a fully formed object (a full-scale version of the application in its opened state as shown in FIG. 2C) displayed to take up an amount of visual space in the simulated reality setting that allows the user to fully interact with the application. In accordance with a determination that the distance between the physical object and the user exceeds the fourth predetermined threshold and does not exceed the third predetermined threshold, the representation of the application is transitioned to a third visual state different than the first and second visual states. For example, when the physical object is located in an intermediate region (e.g., 213b) on the physical surface located between the region farthest from the user and the region closest to the user, the representation of the application is displayed to take up less visual space in the simulated reality setting than the fully formed object of the maximized state, but slightly more visual space than the small object of the minimized state as shown in FIG. 2B. In some embodiments, the second visual state is a maximized visual state in which the amount of information displayed by the representation of the application is unrestricted. In some embodiments, when the representation of the application is in the maximized visual state, the representation of the application displays an amount of information sufficient to allow full user interaction with the application for the application's intended purpose. In some embodiments, the third visual state is a limited visual state in which the amount of information displayed by the representation of the application is less than the amount of information displayed in the maximized visual state, but greater than the amount of information displayed in the minimized visual state. In some embodiments, displaying the representation of the application in the limited visual state allows the application to convey some information to a user while minimizing distraction and reserving system resources. In some embodiments, such as that shown in FIG. 2B, the application is a messaging application, and the representation of the messaging application displays a single message 231 in the limited visual state.

In some embodiments, technique 300 further comprises displaying a virtual representation of the physical object (e.g., 211) (e.g., a computer-generated object) on the physical surface (e.g., 212) in the simulated reality setting.

In some embodiments, the change in the position of the physical object (e.g., 211) on the physical surface (e.g., 212) is detected by a sensor (e.g., infrared (IR) sensor 260 positioned on or near the physical surface). In some embodiments, the physical object comprises the sensor (e.g., the IR sensor is included in the physical object).

In some embodiments, technique 300 further comprises while displaying the representation (e.g., 201) of the application, and prior to modifying the one or more attributes (e.g., visual appearance, orientation, operation of the application, displayed location of the representation of the application) of the representation of the application, detecting a change in the position of the physical object (e.g., 211) on the physical surface (e.g., 212).

While the present disclosure has been shown and described with reference to the embodiments provided herein, it will be understood by those skilled in the art that various changes in form and details may be made without departing from the scope of the present disclosure.

What is claimed is:

1. A method for displaying one or more applications in a simulated reality setting, the method comprising:
   determining a position of a physical object on a physical surface;
   displaying a representation of an application in a simulated reality setting, wherein one or more attributes of the representation of the application are based on the position of the physical object on the physical surface; and
   in response to detecting a change in the position of the physical object on the physical surface, modifying the one or more attributes of the representation of the application based on the change in position of the physical object on the physical surface, wherein modifying the one or more attributes of the representation of the application comprises modifying operation of the application, including:
      transitioning the operation of the application from a primary operational state to a secondary operational state as the position of the physical object moves in a first direction; and
      transitioning the operation of the application from the secondary operational state to the primary operational state as the position of the physical object moves in a second direction different from the first direction;
   wherein, while in the primary operational state, the application is enabled to perform a function, and while in the secondary operational state, the application is not enabled to perform the function.

2. The method of claim 1, wherein modifying the one or more attributes of the representation of the application comprises modifying the display of the representation of the application based on the change in position of the physical object on the physical surface.

3. The method of claim 1, wherein:
   the one or more attributes comprise an orientation of the representation of the application as displayed in the simulated reality setting with respect to a user;
   the change in the position of the physical object on the physical surface comprises a rotation of the physical object on the physical surface; and
   modifying the one or more attributes of the representation of the application based on the change in position of the physical object on the physical surface comprises changing the orientation of the representation of the application based on at least one of a magnitude of the rotation of the physical object on the physical surface or a direction of the rotation of the physical object on the physical surface.

4. The method of claim 1, wherein:
   the one or more attributes comprises a displayed location of the representation of the application;
   the change in the position of the physical object on the physical surface comprises a change in the physical location of the physical object on the physical surface; and
   modifying the one or more attributes of the representation of the application based on the change in position of the physical object on the physical surface comprises changing the displayed location of the representation of the application based on at least one of a magnitude of the change in the physical location of the physical object on the physical surface or direction of the change in the physical location of the physical object on the physical surface.

5. The method of claim 1, wherein:
   modifying the one or more attributes of the representation of the application comprises modifying a visual appearance of the representation of the application;
   the visual appearance of the representation of the application transitions from a primary visual state to a secondary visual state as the position of the physical object moves in a third direction;
   the visual appearance of the representation of the application transitions from the secondary visual state to the primary visual state as the position of the physical object moves in a fourth direction different from the third direction;
   while in the primary visual state, the application is enabled to display a visual feature; and
   while in the secondary visual state, the application is not enabled to display the visual feature.

6. The method of claim 1, wherein displaying the representation of the application comprises displaying a virtual user interface for providing input to the application, wherein the displayed virtual user interface is displayed at a location on the physical surface adjacent a user.

7. A device for displaying one or more applications in a simulated reality setting, comprising:
   one or more processors; and
   memory storing one or more programs configured to be executed by the one or more processors, the one or more programs including instructions for:

determining a position of a physical object on a physical surface;

displaying a representation of an application in a simulated reality setting, wherein one or more attributes of the representation of the application are based on the position of the physical object on the physical surface; and in response to detecting a change in the position of the physical object on the physical surface, modifying the one or more attributes of the representation of the application based on the change in position of the physical object on the physical surface, wherein modifying the one or more attributes of the representation of the application comprises modifying operation of the application, including:

transitioning the operation of the application from a primary operational state to a secondary operational state as the position of the physical object moves in a first direction; and transitioning the operation of the application from the secondary operational state to the primary operational state as the position of the physical object moves in a second direction different from the first direction;

wherein, while in the primary operational state, the application is enabled to perform a function, and while in the secondary operational state, the application is not enabled to perform the function.

8. The device of claim 7, wherein modifying the one or more attributes of the representation of the application comprises modifying the display of the representation of the application based on the change in position of the physical object on the physical surface.

9. The device of claim 7, wherein:
the one or more attributes comprise an orientation of the representation of the application as displayed in the simulated reality setting with respect to a user;
the change in the position of the physical object on the physical surface comprises a rotation of the physical object on the physical surface; and
modifying the one or more attributes of the representation of the application based on the change in position of the physical object on the physical surface comprises changing the orientation of the representation of the application based on at least one of a magnitude of the rotation of the physical object on the physical surface or a direction of the rotation of the physical object on the physical surface.

10. The device of claim 7, wherein:
the one or more attributes comprises a displayed location of the representation of the application;
the change in the position of the physical object on the physical surface comprises a change in the physical location of the physical object on the physical surface; and
modifying the one or more attributes of the representation of the application based on the change in position of the physical object on the physical surface comprises changing the displayed location of the representation of the application based on at least one of a magnitude of the change in the physical location of the physical object on the physical surface or direction of the change in the physical location of the physical object on the physical surface.

11. The device of claim 7, wherein:
modifying the one or more attributes of the representation of the application comprises modifying a visual appearance of the representation of the application;
the visual appearance of the representation of the application transitions from a primary visual state to a secondary visual state as the position of the physical object moves in a third direction;
the visual appearance of the representation of the application transitions from the secondary visual state to the primary visual state as the position of the physical object moves in a fourth direction different from the third direction;
while in the primary visual state, the application is enabled to display a visual feature; and
while in the secondary visual state, the application is not enabled to display the visual feature.

12. The device of claim 7, wherein:
determining the position of the physical object on the physical surface comprises determining whether a distance between the physical object and a user exceeds a first predetermined threshold; and
modifying the one or more attributes of the representation of the application comprises:
in accordance with a determination that the distance between the physical object and the user exceeds the first predetermined threshold, transitioning the application to a first operational state.

13. The device of claim 12, wherein:
determining the position of the physical object on the physical surface further comprises determining whether the distance between the physical object and the user exceeds a second predetermined threshold; and
modifying the one or more attributes of the representation of the application further comprises:
in accordance with a determination that the distance between the physical object and the user does not exceed the second predetermined threshold, transitioning the application to a second operational state different than the first operational state; and
in accordance with a determination that the distance between the physical object and the user exceeds the second predetermined threshold and does not exceed the first predetermined threshold, transitioning the application to a third operational state different than the first and second operational states.

14. The device of claim 7, wherein:
determining the position of the physical object on the physical surface comprises determining whether a distance between the physical object and a user exceeds a third predetermined threshold; and
modifying the one or more attributes of the representation of the application comprises:
in accordance with a determination that the distance between the physical object and the user exceeds the third predetermined threshold, transitioning the representation of the application to a first visual state.

15. The device of claim 14, wherein:
determining the position of the physical object on the physical surface further comprises determining whether the distance between the physical object and the user exceeds a fourth predetermined threshold; and
modifying the one or more attributes of the representation of the application further comprises:
in accordance with a determination that the distance between the physical object and the user does not exceed the fourth predetermined threshold, transitioning the representation of the application to a second visual state different than the first visual state; and in accordance with a determination that the distance between the physical object and the user exceeds the fourth predetermined threshold and does not exceed the third predetermined threshold, transitioning the representation of the application to a third visual state different than the first and second visual states.

16. The device of claim 7, the instructions further comprising:
displaying a virtual representation of the physical object on the physical surface in the simulated reality setting.

17. The device of claim 7, wherein the change in the position of the physical object on the physical surface is detected by a sensor.

18. The device of claim 17, wherein the physical object comprises the sensor.

19. The device of claim 7, wherein the representation of the application is displayed having an elevated position above the physical object in the simulated reality setting.

20. The device of claim 7, wherein displaying the representation of the application comprises displaying a virtual user interface for providing input to the application, wherein the displayed virtual user interface is displayed at a location on the physical surface adjacent a user.

21. The device of claim 7, the instructions further comprising:
while displaying the representation of the application, and prior to modifying the one or more attributes of the representation of the application, detecting a change in the position of the physical object on the physical surface.

22. A non-transitory computer-readable storage medium storing one or more programs configured to be executed by one or more processors, the one or more programs including instructions for:
determining a position of a physical object on a physical surface;
displaying a representation of an application in a simulated reality setting, wherein one or more attributes of the representation of the application are based on the position of the physical object on the physical surface; and
in response to detecting a change in the position of the physical object on the physical surface, modifying the one or more attributes of the representation of the application based on the change in position of the physical object on the physical surface, wherein modifying the one or more attributes of the representation of the application comprises modifying operation of the application, including:
transitioning the operation of the application from a primary operational state to a secondary operational state as the position of the physical object moves in a first direction; and
transitioning the operation of the application from the secondary operational state to the primary operational state as the position of the physical object moves in a second direction different from the first direction;
wherein, while in the primary operational state, the application is enabled to perform a function, and while in the secondary operational state, the application is not enabled to perform the function.

23. The non-transitory computer-readable storage medium of claim 22, wherein modifying the one or more attributes of the representation of the application comprises modifying the display of the representation of the application based on the change in position of the physical object on the physical surface.

24. The non-transitory computer-readable storage medium of claim 22, wherein:
the one or more attributes comprise an orientation of the representation of the application as displayed in the simulated reality setting with respect to a user;
the change in the position of the physical object on the physical surface comprises a rotation of the physical object on the physical surface; and
modifying the one or more attributes of the representation of the application based on the change in position of the physical object on the physical surface comprises changing the orientation of the representation of the application based on at least one of a magnitude of the rotation of the physical object on the physical surface or a direction of the rotation of the physical object on the physical surface.

25. The non-transitory computer-readable storage medium of claim 22, wherein:
the one or more attributes comprises a displayed location of the representation of the application;
the change in the position of the physical object on the physical surface comprises a change in the physical location of the physical object on the physical surface; and
modifying the one or more attributes of the representation of the application based on the change in position of the physical object on the physical surface comprises changing the displayed location of the representation of the application based on at least one of a magnitude of the change in the physical location of the physical object on the physical surface or direction of the change in the physical location of the physical object on the physical surface.

26. The non-transitory computer-readable storage medium of claim 22, wherein:
modifying the one or more attributes of the representation of the application comprises modifying a visual appearance of the representation of the application;
the visual appearance of the representation of the application transitions from a primary visual state to a secondary visual state as the position of the physical object moves in a third direction;
the visual appearance of the representation of the application transitions from the secondary visual state to the primary visual state as the position of the physical object moves in a fourth direction different from the third direction;
while in the primary visual state, the application is enabled to display a visual feature; and
while in the secondary visual state, the application is not enabled to display the visual feature.

27. The non-transitory computer-readable storage medium of claim 22, wherein displaying the representation of the application comprises displaying a virtual user interface for providing input to the application, wherein the displayed virtual user interface is displayed at a location on the physical surface adjacent a user.

* * * * *